(12) United States Patent
Jeong et al.

(10) Patent No.: US 10,659,933 B2
(45) Date of Patent: May 19, 2020

(54) ELECTRONIC DEVICE AND INFORMATION PROCESSING SYSTEM INCLUDING THE SAME

(71) Applicant: Samsung Electronics Co., Ltd., Gyeonggi-do (KR)

(72) Inventors: Seong Ook Jeong, Suwon-si (KR); Geun Woo Kim, Gwangju (KR); Bum Joon Kim, Seoul (KR); Heum Mo Gu, Suwon-si (KR); Jin Mook Lim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/611,736

(22) Filed: Jun. 1, 2017

(65) Prior Publication Data

US 2017/0353845 A1 Dec. 7, 2017

(30) Foreign Application Priority Data

Jun. 1, 2016 (KR) .......................... 10-2016-0068405

(51) Int. Cl.
*H04W 4/029* (2018.01)
*H04W 4/38* (2018.01)
(Continued)

(52) U.S. Cl.
CPC .............. *H04W 4/21* (2018.02); *G06Q 50/01* (2013.01); *H04M 1/7253* (2013.01); *H04W 4/38* (2018.02); *H04W 88/02* (2013.01)

(58) Field of Classification Search
CPC ........... H04W 4/00; H04W 4/08; H04W 4/20; H04W 4/203; H04W 4/24; H04W 4/30;
(Continued)

(56) References Cited

U.S. PATENT DOCUMENTS 7,441,180 B1* 10/2008 Kaczmarek ............. G06F 21/10
715/201
8,589,437 B1 11/2013 Khomenko et al.
(Continued)

FOREIGN PATENT DOCUMENTS

EP 2709384 A2 3/2014
KR 10-2015-0110053 A 10/2015

OTHER PUBLICATIONS

International Search Report and Written Opinion regarding International Application No. PCT/KR2017/005476, dated Aug. 25, 2017, 13 pages.
(Continued)

*Primary Examiner* — San Htun

(57) ABSTRACT

An information processing system includes a first electronic device configured to collect data, a second electronic device configured to obtain at least a portion of the data from the first electronic device and process the at least the portion of the data, and a server configured to support a sharing service that obtains the processed data from the second electronic device and posts the processed data in a designated method. The second electronic device is configured to transmit account information on at least one account joined to the sharing service to the first electronic device. The first electronic device is configured to analyze the account information to verify the at least one account, generate an object supporting posting the processed data on the sharing service, and output the object to a display of the first electronic device.

17 Claims, 18 Drawing Sheets

(51) Int. Cl.
*H04W 4/21* (2018.01)
*H04M 1/725* (2006.01)
*G06Q 50/00* (2012.01)
*H04W 88/02* (2009.01)

(58) Field of Classification Search
CPC ........... H04W 4/38; H04W 4/50; H04W 4/70; H04W 4/80; H04W 8/18; H04W 8/205
See application file for complete search history.

(56) References Cited

U.S. PATENT DOCUMENTS

| | | | |
|---|---|---|---|
| 9,197,593 B2 | 11/2015 | Lee et al. | |
| 2010/0257251 A1* | 10/2010 | Mooring | H04W 4/21 709/216 |
| 2014/0024354 A1* | 1/2014 | Haik | G01S 5/0018 455/418 |
| 2014/0039804 A1* | 2/2014 | Park | A61B 5/0002 702/19 |
| 2014/0080419 A1 | 3/2014 | Ko et al. | |
| 2014/0288680 A1* | 9/2014 | Hoffman | G06K 9/00342 700/91 |
| 2014/0306821 A1* | 10/2014 | Rahman | G05B 1/01 340/539.11 |
| 2015/0180820 A1 | 6/2015 | Lee et al. | |
| 2015/0261775 A1 | 9/2015 | Shin et al. | |
| 2015/0355800 A1 | 12/2015 | Cronin | |
| 2016/0054567 A1 | 2/2016 | Kim et al. | |
| 2016/0095017 A1* | 3/2016 | Ely | H04W 4/027 455/454 |
| 2016/0106360 A1 | 4/2016 | Choi et al. | |
| 2017/0374497 A1 | 12/2017 | Ko et al. | |

OTHER PUBLICATIONS

Supplementary Partial European Search Report dated Feb. 7, 2019 in connection with European Patent Application No. 17 80 6939, 13 pages.

Supplementary European Search Report dated May 9, 2019 in connection with European Patent Application No. 17 80 6939, 14 pages.

* cited by examiner

ELECTRONIC DEVICE AND INFORMATION PROCESSING SYSTEM INCLUDING THE SAME

CROSS-REFERENCE TO RELATED APPLICATION(S)

This application claims the benefit under 35 U.S.C. § 119(a) of a Korean patent application filed on Jun. 1, 2016 in the Korean Intellectual Property Office and assigned Serial number 10-2016-0068405, the entire disclosure of which is hereby incorporated by reference.

TECHNICAL FIELD

The present disclosure relates to information processing technology.

BACKGROUND

Electronic devices like a smartphone provide a variety of functions, such as an exercise service, that utilize various information obtained based on sensors of the electronic devices in addition to a phone function and an internet function. With the exercise service, for instance, a user is able to record the exercise carried out through an exercise application supported by the electronic device, and the record of the exercise is analyzed to be provided to the user.

In addition, the electronic device transmits the information to a server supporting a social networking service (SNS) to provide a sharing service that enables a user of an external electronic device to share the corresponding information. For instance, the electronic device transmits the exercise information, such as an exercise time, an exercise distance, a calorie consumption, weather, etc., to the SNS server to share the corresponding information with the user of the external electronic device.

Meanwhile, wearable electronic devices, e.g., a smart watch, have been actively developed. Since the wearable electronic devices are worn on the body of the user, they have advantages on mobility and portability. The wearable electronic devices provide the same or similar functions as those of the electronic devices like the smartphone. As an example, the wearable electronic devices are able to provide the exercise service or the sharing service.

SUMMARY

To address the above-discussed deficiencies, it is a primary object to provide an information processing system including a first electronic device transmitting data associated with contents to share, a second electronic device generating the contents to share using the data obtained from the first electronic device and transmitting the generated contents to a server, and the server.

In addition, an aspect of the present disclosure is to provide an electronic device providing a user interface that obtains account information associated with a server providing a sharing service from an external electronic device and verifies whether contents are transmitted to the server using the obtained account information.

In addition, an aspect of the present disclosure is to provide an electronic device obtaining data from an external electronic device and generating contents, which are to be transmitted to a server, using template contents associated with the obtained data.

In accordance with an aspect of the present disclosure, an electronic device includes a sensor module configured to collect data, a display configured to display at least a portion of the data, a communication module configured to communicate with an external electronic device, a memory configured to store the data, and a processor configured to be operatively connected to the sensor module, the display, the communication module, and the memory, the memory storing instructions, the instructions, when executed by the processor, causing the processor to obtain account information on at least one account joined to a sharing service from the external electronic device, analyze the account information to verify the at least one account, generate an object supporting to share at least a portion of the data with the sharing service, and output the object through the display.

In accordance with another aspect of the present disclosure, an electronic device includes a display, a communication module configured to communicate with an external electronic device, a memory, and a processor configured to be operatively connected to the display, the communication module, and the memory, the memory storing instructions, the instructions, when executed by the processor, causing the processor to obtain data from the external electronic device, generate contents to share using template contents designated according to a type of the data and at least a portion of the data, and transmit the contents to share to a server providing a sharing service.

In accordance with another aspect of the present disclosure, an information processing system includes a first electronic device configured to collect data, a second electronic device configured to obtain at least a portion of the data from the first electronic device and process the at least the portion of the data, and a server configured to support a sharing service that obtains the processed data from the second electronic device and posts the processed data in a designated method. The second electronic device is configured to transmit account information on at least one account joined to the sharing service to the first electronic device, and the first electronic device is configured to analyze the account information to verify the at least one account, generate an object supporting posting the processed data on the sharing service, and output the object to a display of the first electronic device.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

For a more complete understanding of the present disclosure and its advantages, reference is now made to the following description taken in conjunction with the accompanying drawings, in which like reference numerals represent like parts.

Throughout the drawings, it should be noted that like reference numbers are used to depict the same or similar elements, features, and structures.

DETAILED DESCRIPTION

Figure 1:
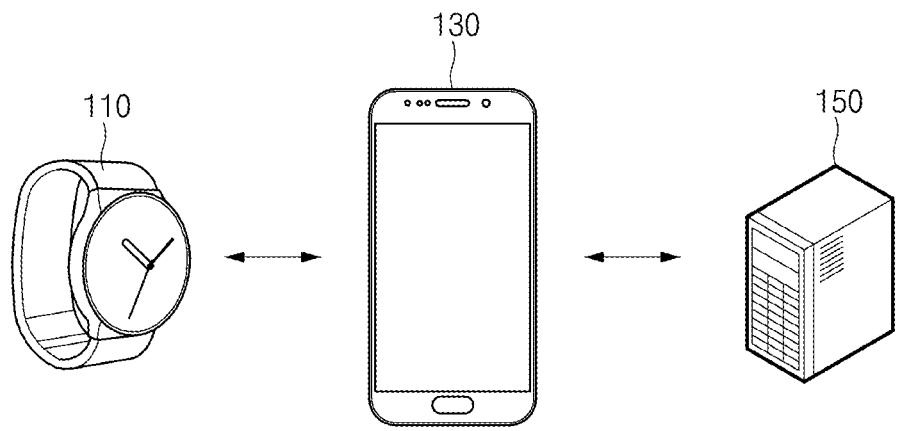
FIG. 1 illustrates a system related to information processing according to an embodiment of the present disclosure.

FIGS. 1 through 17, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged electronic device.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The term "include," "comprise," and "have", or "may include," or "may comprise" and "may have" used herein indicates disclosed functions, operations, or existence of elements but does not exclude other functions, operations or elements.

For example, the expressions "A or B," or "at least one of A and/or B" may indicate A and B, A, or B. For instance, the expression "A or B" or "at least one of A and/or B" may indicate (1) at least one A, (2) at least one B, or (3) both at least one A and at least one B.

The terms such as "1st," "2nd," "first," "second," and the like used herein may refer to modifying various different elements of various embodiments of the present disclosure, but are not intended to limit the elements. For instance, "a first user device" and "a second user device" may indicate different users regardless of order or importance. For example, a first component may be referred to as a second component and vice versa without departing from the scope and spirit of the present disclosure.

In various embodiments of the present disclosure, it is intended that when a component (for example, a first component) is referred to as being "operatively or communicatively coupled with/to" or "connected to" another component (for example, a second component), the component may be directly connected to the other component or connected through another component (for example, a third component). In various embodiments of the present disclosure, it is intended that when a component (for example, a first component) is referred to as being "directly connected to" or "directly accessed" another component (for example, a second component), another component (for example, a third component) does not exist between the component (for example, the first component) and the other component (for example, the second component).

The expression "configured to" used in various embodiments of the present disclosure may be interchangeably used with "suitable for," "having the capacity to," "designed to," "adapted to," "made to," or "capable of" according to the situation, for example. The term "configured to" may not necessarily indicate "specifically designed to" in terms of hardware. Instead, the expression "a device configured to" in some situations may indicate that the device and another device or part are "capable of." For example, the expression "a processor configured to perform A, B, and C" may indicate a dedicated processor (for example, an embedded processor) for performing a corresponding operation or a general purpose processor (for example, a central processing unit (CPU) or application processor (AP)) for performing corresponding operations by executing at least one software program stored in a memory device.

Terms used in various embodiments of the present disclosure are used to describe certain embodiments of the present disclosure, but are not intended to limit the scope of other embodiments. The terms of a singular form may include plural forms unless they have a clearly different meaning in the context. Otherwise, all terms used herein may have the same meanings that are generally understood by a person skilled in the art. In general, terms defined in a dictionary should be considered to have the same meanings as the contextual meaning of the related art, and, unless clearly defined herein, should not be understood differently or as having an excessively formal meaning. In any case, even the terms defined in the present specification are not intended to be interpreted as excluding embodiments of the present disclosure.

An electronic device according to various embodiments of the present disclosure may include at least one of a smartphone, a tablet personal computer (PC), a mobile phone, a video telephone, an electronic book reader, a desktop PC, a laptop PC, a netbook computer, a workstation, a server, a personal digital assistant (PDA), a portable multimedia player (PMP), a Motion Picture Experts Group (MPEG-1 or MPEG-2) Audio Layer 3 (MP3) player, a mobile medical device, a camera, or a wearable device. The wearable device may include at least one of an accessory-type device (e.g., a watch, a ring, a bracelet, an anklet, a necklace, glasses, a contact lens, a head-mounted device (HMD)), a textile- or clothing-integrated-type device (e.g., an electronic apparel), a body-attached-type device (e.g., a skin pad or a tattoo), or a bio-implantable-type device (e.g., an implantable circuit)

In some various embodiments of the present disclosure, an electronic device may be a home appliance. The smart home appliance may include at least one of, for example, a television (TV), a digital video/versatile disc (DVD) player, an audio, a refrigerator, an air conditioner, a cleaner, an oven, a microwave oven, a washing machine, an air cleaner, a set-top box, a home automation control panel, a security control panel, a television (TV) box (e.g., SAMSUNG HOMESYNC™, APPLE TV®, or GOOGLE TV®, a game console (e.g., XBOX® or PLAYSTATION®), an electronic dictionary, an electronic key, a camcorder, or an electronic picture frame In other various embodiments of the present disclosure, an electronic device may include at least one of various medical devices (e.g., various portable medical measurement devices (e.g., a blood glucose measuring device, a heart rate measuring device, a blood pressure measuring device, a body temperature measuring device, or the like), a magnetic resonance angiography (MRA), a magnetic resonance imaging (MRI), a computed tomography (CT), a scanner, an ultrasonic device, or the like), a navigation device, a global navigation satellite system (GNSS), an event data recorder (EDR), a flight data recorder (FDR), a vehicle infotainment device, electronic equipment for vessels (e.g., a navigation system, a gyrocompass, or the like), avionics, a security device, a head unit for a vehicle, an industrial or home robot, an automatic teller machine (ATM), a point of sales (POS) device of a store, or an Internet of things (IoT) device (e.g., a light bulb, various sensors, an electric or gas meter, a sprinkler, a fire alarm, a thermostat, a streetlamp, a toaster, exercise equipment, a hot water tank, a heater, a boiler, or the like).

According to various embodiments of the present disclosure, an electronic device may include at least one of a part of furniture or a building/structure, an electronic board, an electronic signature receiving device, a projector, or a measuring instrument (e.g., a water meter, an electricity meter, a gas meter, a wave meter, or the like). An electronic device may be one or more combinations of the above-mentioned devices. An electronic device according to some various embodiments of the present disclosure may be a flexible device. An electronic device according to an embodiment of the present disclosure is not limited to the above-mentioned devices, and may include new electronic devices with the development of new technology.

Hereinafter, an electronic device according to various embodiments of the present disclosure will be described in more detail with reference to the accompanying drawings. The term "user" used herein may refer to a person who uses an electronic device or may refer to a device (e.g., an artificial intelligence electronic device) that uses an electronic device.

FIG. 1 illustrates a system related to information processing according to an embodiment of the present disclosure.

According to various embodiments, an electronic device may provide a function utilizing information obtained based on sensors, e.g., an exercise service. As an example, the electronic device may record exercise information on an exercise performed by a user through an exercise application and analyze the exercise information to provide the analyzed result to the user. In addition, the electronic device may transmit information to a server for sharing the information, e.g., a server supporting a social networking service (SNS) to support a sharing service that allows a user of another electronic device to share the information. For instance, the electronic device may transmit the exercise information, such as an exercise time, an exercise distance, a calorie-consumption, weather, etc., to the SNS server to share the exercise information with the user of the another electronic device.

However, in a case that a screen size of a display or a storage space of a memory of the electronic device is small or a network connectivity of the electronic device is limited, the electronic device may be difficult to share information with relatively large amount of data with the user of the another electronic device. As an example, the electronic device having the small display screen size may be difficult to fully display various exercise information on the display. As another example, the electronic device with the limited network connectivity may be difficult to transmit content including images related to the exercise information to the server.

Accordingly, the information processing system may be separated into a first electronic device 110 providing the information to a second electronic device 130, the second electronic device 130 processing the information and transmitting the processed information to a server 150, and the server 150 sharing the processed information with another external electronic device (not shown) and each device of the information processing system may perform a designated function, and thus the information processing system may support the information that the user wants to share to be rapidly processed.

Each device of the information processing system may perform the following functions. The first electronic device 110 may transmit data only associated with the information to share to the second electronic device 130, and the second electronic device 130 may generate content associated to the information, which is to be shared, by using the obtained data and transmit the generated content to the server 150. The server 150 may support the user of the another external electronic device to verify the content transmitted from the second electronic device 130 by a designated method, such as a method of posting the content on a web page.

According to an embodiment, the first electronic device 110 may collect the exercise information on the exercise performed by the user using the sensors. The first electronic device 110 may display only the exercise information, which is to be shared, among various exercise information and support the user to easily verify the information to be shared. In addition, the first electronic device 110 may obtain account information associated with the server 150 from the second electronic device 130. The first electronic device 110 may provide the user with a user interface to verify whether the information is shared with the server 150 using the obtained account information. As an example, the first electronic device 110 may analyze the account information to verify accounts joined to the sharing service provided by the server 150 and generate objects (e.g., buttons), which receive an input from the user, in the same or similar number as that of the accounts to display the objects through the display. Accordingly, the user may easily verify the type and the number of servers 150 that may share the information by verifying the objects.

According to an embodiment, the second electronic device 130 may obtain a portion of data among the exercise information, which is to be shared, from the first electronic device 110. The second electronic device 130 may analyze the obtained data to determine the type of exercise. The second electronic device 130 may select a template content designated according to the type of exercise and generate the content to share using the selected template content and the analyzed result of the obtained data. Since the second electronic device 130 may generate the content to share using the template content, the information processing system may support the information to be shared in various ways. The template content may include, for example, an image or a map, which is designated according to the type of exercise. The template content may include a moving image content, an audio content, or a virtual reality (VR) content (e.g., a street view). The template content may include a photograph (e.g., a selfie taken before, during, or after exercise) including time information close to a time during which a corresponding exercise is carried out. In a case that the photograph is stored in the second electronic device 130, the second electronic device 130 may generate the content to share using the stored photograph and the exercise information. According to an embodiment, the second electronic device 130 may utilize at least a portion of the obtained data when generating the content to share. In this case, the second electronic device 130 may select the at least a portion of the obtained data based on priorities designated according to the type of exercise.

According to an embodiment, the first electronic device 110 may be, but not limited to, a wearable electronic device, and the second electronic device 130 may be, but not limited to, a mobile electronic device connected to the wearable electronic device through a wired and wireless communication. As an example, the first electronic device 110 and the second electronic device 130 may be devices operated as a companion function.

Figure 2:
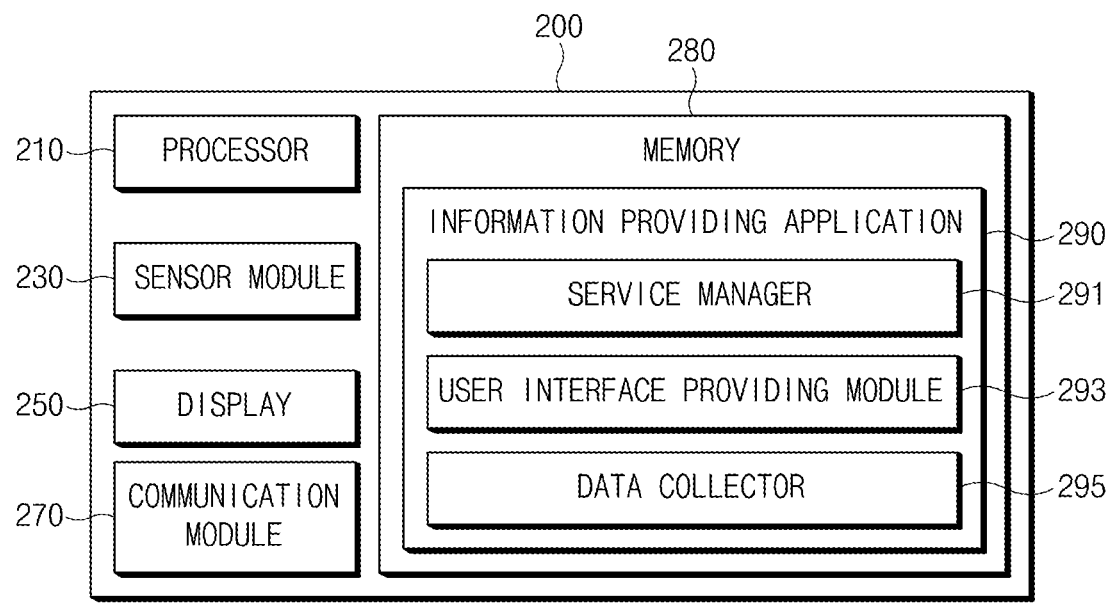
FIG. 2 illustrates an electronic device that provides information according to an embodiment of the present disclosure.

FIG. 2 illustrates an electronic device 200 that provides information according to an embodiment of the present disclosure. The electronic device 200 shown in FIG. 2 may have the same or similar configurations as those of the first electronic device 110 of FIG. 1.

Referring to FIG. 2, the electronic device 200 may include a processor 210, a sensor module 230, a display 250, a communication module 270, and a memory 280. However, the configurations of the electronic device 200 should not be limited thereto or thereby. According to various embodiments, at least one component of the electronic device 200 may be omitted from the electronic device 200, or an additional component may be added to the electronic device 200.

The processor 210 may execute a calculation or a data processing operation for controlling and/or communicating with at least one other component(s) of the electronic device 200. The processor 210 may load a command (or an instruction) or data received from at least one component among the other components (e.g., a non-volatile memory) into a volatile memory to process the command or the data and store various data in the non-volatile memory. As an example, the processor 210 may execute instructions of an application (e.g., an information providing application 290) stored or loaded into the memory 280 along with a specified routine. In addition, the processor 210 may store the exercise information collected based on the sensor module 230 in the memory 280.

The sensor module 230 may measure a physical quantity or detect an operating state of the electronic device 200 and convert the measured or detected information into electrical signals. According to an embodiment, the sensor module 230 may convert information measured or detected when the user is exercising into the electrical signals and transmit the electrical signals to the processor 210. In this case, the processor 210 may generate the exercise information, e.g., the exercise time, the exercise distance, the calorie-consumption, etc., using information corresponding to the electrical signals received from the sensor module 230.

The display 250 may display various contents (e.g., a text, an image, a video, an icon, a symbol, and the like) to the user. As an example, the display 250 may display an object corresponding to the exercise information on a screen. In this regard, the screen on which the object corresponding to the exercise information is displayed may be an execution screen for some functions of the information providing application 290. In addition, the display 250 may include a touch screen and may receive, for example, a touch, gesture, proximity, or hovering input using an electronic pen or a portion of a user's body.

The communication module 270 may set a communication between the electronic device 200 and an external device (e.g., the second electronic device 130 or the server 150 shown in FIG. 1). For instance, the communication module 270 may be connected to a network through a wired or wireless communication link to communicate with the external device.

The memory 280 may include a volatile and/or nonvolatile memory. The memory 280 may store instructions or data associated with at least one other component(s) of the electronic device 200. According to an embodiment, the memory 280 may store software and/or program. The program may include an application (e.g., the information providing application 290). The application may be a set of programs (or instructions) for executing at least one designated function and may be loaded into the memory 280 to be executed by the processor 210 according to a defined routine.

The information providing application 290 may include at least one instruction to execute a function associated with an information providing operation. The information providing application 290 may include a service manager 291, a user interface providing module 293, and a data collector 295, which are separated from each other depending on functions thereof. The service manager 291 may include instructions associated with a communication function with the external device (e.g., the second electronic device 130 shown in FIG. 1). The instructions associated with the communication function may include an instruction for generating a message to be transmitted to the external device according to a protocol designated based on data, which are to be provided to the external device, an instruction for managing an information synchronization state, account information, information for the data selection, or a sharing state through the message received from the external device, or an instruction for transmitting the generated message to the external device. In this regard, the message may include a pair of messages for data sharing between the electronic device 200 and the external device. For instance, the message may include a request message and a response message. The message may include a header and a body, and the data to be shared may form the body.

The instruction for generating the message may include an instruction for allowing the data collected based on the information for the data selection to be included in the body of the message. The information for the data selection may include information designated according to user's preference or information set by the user. The instruction for managing the account information may include instructions for receiving the account information from the external device, analyzing the account information, and verifying the account joined to the sharing service provided by a server (e.g., the server 150 shown in FIG. 1).

The user interface providing module 293 may include an instruction associated with a function of providing a user interface. The instruction associated with the user interface providing function may include an instruction for generating the objects (e.g., buttons), which receive the input from the user, in the same or similar number as that of the accounts joined to the sharing service or an instruction for outputting the generated objects to the display 250.

The data collector 295 may include an instruction associated with a function of collecting the data provided to the external device. The instruction associated with the collection function of the data may include an instruction for collecting at least a portion of the data provided to the external device based on the information for the data selection or an instruction for packaging the collected data. In this regard, the instruction for collecting at least the portion of the data provided to the external device may include an instruction for collecting a minimum amount of data required for information sharing.

According to an embodiment, at least one instruction included in the information providing application 290 may further include an instruction for collecting sensor information about the exercise based on the sensor module 230 or an instruction for generating the exercise information using the sensor information.

Figure 3:
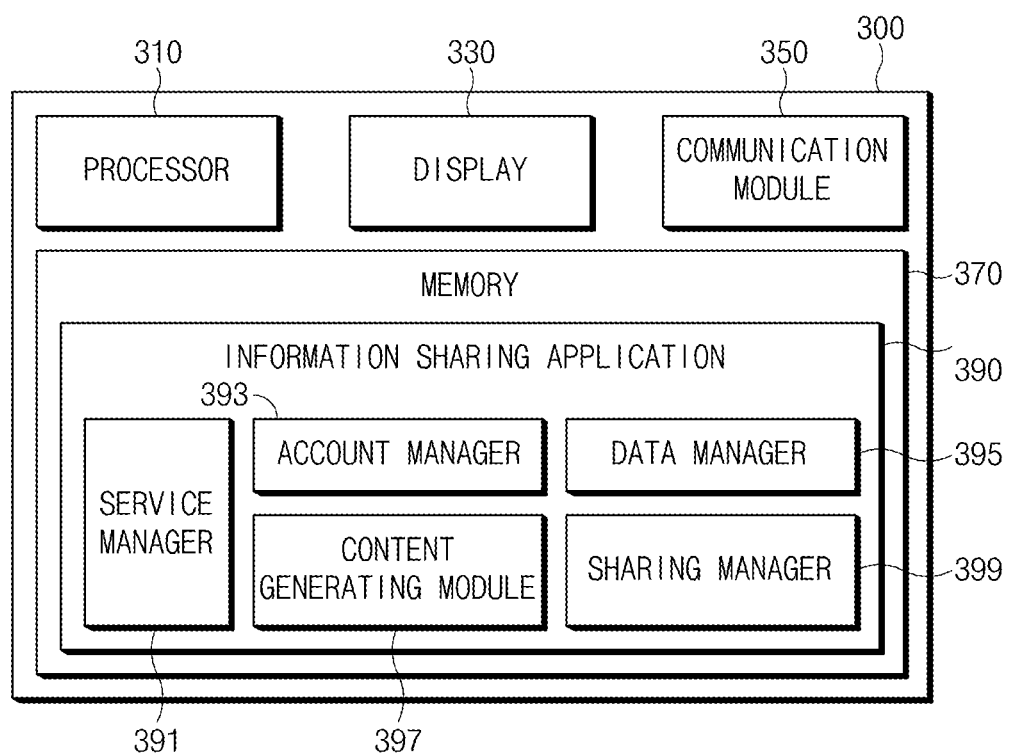
FIG. 3 illustrates a second electronic device that shares information according to an embodiment of the present disclosure.

FIG. 3 illustrates a second electronic device 300 that shares information according to an embodiment of the present disclosure. The electronic device 300 shown in FIG. 3 may have the same or similar configurations as those of the second electronic device 130 of FIG. 1.

Referring to FIG. 3, the electronic device 300 may include a processor 310, a display 330, a communication module 350, and a memory 370. However, the configurations of the electronic device 300 should not be limited thereto or thereby. According to various embodiments, at least one component of the electronic device 300 may be omitted from the electronic device 300, or an additional component may be added to the electronic device 300.

The processor 310 may execute a calculation or a data processing operation for controlling and/or communicating with at least one other component(s) of the electronic device 300. The processor 310 may load a command (or an instruction) or data received from at least one component among the other components (e.g., a non-volatile memory) into a volatile memory to process the command or the data and store various data in the non-volatile memory. As an example, the processor 310 may execute instructions of an application (e.g., an information sharing application 390) stored or loaded into the memory 370 along with a specified routine.

The display 330 may display various contents to the user. As an example, the display 330 may output a screen associated with data received from an external device (e.g., the first electronic device 110 or the server 150 of FIG. 1). For instance, when data associated with activation or deactivation of an account are received from the external device (e.g., the first electronic device 110 of FIG. 1), the electronic device 300 may output a screen through the display 330 to support the activation or deactivation of the account. In addition, when data associated with a shared content are received from the external device (e.g., the server 150 of FIG. 1), the electronic device 300 may output a screen of the shared content through the display 330. In this regard, the screen of the shared content may be, for example, an execution screen for some functions of the information sharing application 390. In addition, the display 330 may include a touch screen and may receive, for example, a touch, gesture, proximity, or hovering input using an electronic pen or a portion of a user's body.

The communication module 350 may set a communication between the electronic device 300 and an external device (e.g., the first electronic device 110 or the server 150 shown in FIG. 1). For instance, the communication module 350 may be connected to a network through a wired or wireless communication link to communicate with the external device.

The memory 370 may include a volatile and/or nonvolatile memory. The memory 370 may store instructions or data associated with at least one other component(s) of the electronic device 300. According to an embodiment, the memory 370 may store software and/or program. The program may include an application (e.g., the information sharing application 390).

The information sharing application 390 may include at least one instruction to execute a function associated with information sharing operation. The information sharing application 390 may include a service manager 391, an account manager 393, a data manager 395, a content generating module 397, and a sharing manager 399, which are separated from each other depending on functions thereof. The service manager 391 may include an instruction associated with a communication function with the external device (e.g., the first electronic device 110 shown in FIG. 1). The instruction associated with the communication function may include an instruction for generating a message to be transmitted to the external device according to a protocol designated based on data, which are to be provided to the external device, an instruction for analyzing and processing the data received from the external device (e.g., the first electronic device 110 of FIG. 1), or an instruction for transmitting the generated message to the external device.

The instruction for generating the message may include an instruction for allowing account information on an account joined to a sharing service provided by a server (e.g., the server 150 shown in FIG. 1) to be included in a body of the message. The instruction for analyzing and processing the received data may include an instruction for analyzing the received data to determine the type of exercise.

The account manager 393 may include an instruction associated with the management of the account joined to the sharing service. The instruction associated with the management of the account may include an instruction for storing and deleting user register information or an instruction for managing a token received from the server. The token may include login information to the server. The login information may include, for example, an access time, an access validity period, etc. As an example, an account corresponding to a token whose access validity period is expired may not be authorized to access the server, and the token whose access validity period is expired may be deleted from the memory 370.

The data manager 395 may include an instruction associated with a function of processing the data received from the external device (e.g., the first electronic device 110 of FIG. 1). The instruction associated with the data processing function may include an instruction for determining a validity of the data. The validity of the data may be determined based on the type of exercise that is verified by analyzing the data. In addition, the validity of the data may be determined according to whether the data are selected based on the information for the data selection described with reference to FIG. 2. In addition, the validity of the data may be determined according to whether information associated with security is included.

The content generating module 387 may include an instruction associated with a function of generating the content using the data received from the external device (e.g., the first electronic device 110 of FIG. 1). The instruction associated with a function of generating the content may include an instruction for selecting at least a portion of the received data using priorities designated according to the type of exercise, an instruction for selecting the template content based on the type of exercise, or an instruction for generating the content to share using the at least a portion of the received data and the template content. The priorities may be a reference order of the exercise information designated according to the type of exercise. As an example, in a case that the type of exercise is walking, the exercise time, the exercise distance, and the exercise speed of the user are respectively designated as first, second, and third priorities. As another example, in a case that the type of exercise is running, the exercise time, the exercise distance, and pace information of the user are respectively designated as first, second, and third priorities. The instruction for selecting the template content may include an instruction for selecting at least one content among contents previously stored in the memory 370 based on the type of exercise. The content to share may be generated differently depending on the type of exercise or the type of the at least a portion of the received data. As an example, in a case that the at least a portion of the received data includes location data, the content to share may include a map including an object (e.g., an image) corresponding to the location data.

The sharing manager 399 may include an instruction associated with a function of transmitting the content to share to the server. The instruction associated with a function of transmitting the content to share may include an instruction for transmitting the content to share to at least one server associated with at least one account joined to the sharing service. For instance, in a case that a plurality of accounts joined to a plurality of sharing services provided by a plurality of servers exists, the electronic device 300 may transmit the content to share to each of the servers.

According to an embodiment, at least one of the information providing application 290 shown in FIG. 2 and the information sharing application 390 shown in FIG. 3 may include an exercise application supporting to process the exercise information with respect to the exercise performed by the user. According to an embodiment, the information providing application 290 shown in FIG. 2 may support the same or similar function as that of the information sharing application 390 shown in FIG. 3.

As described above, according to various embodiments, an electronic device (e.g., the electronic device 200) may include a sensor module (e.g., the sensor module 230) configured to collect data, a display (e.g., the display 250) configured to display at least a portion of the data, a communication module (e.g., the communication module 270) configured to communicate with an external electronic device, a memory (e.g., the memory 280) configured to store the data, and a processor (e.g., the processor 210) configured to be operatively connected to the sensor module, the display, the communication module, and the memory, the memory storing instructions, the instructions, when executed by the processor, causing the processor to obtain account information on at least one account joined to a sharing service from the external electronic device, analyze the account information to verify the at least one account, generate an object supporting to share at least a portion of the data with the sharing service, and output the object through the display.

According to various embodiments, the memory may be configured to store the instructions, when executed by the processor, causing the processor to transmit the at least the portion of the data to the external electronic device when the object is selected.

According to various embodiments, the memory may be configured to store the instructions, when executed by the processor, causing the processor to output only an object associated with an account selected by a user's setting to the display.

According to various embodiments, the memory may be configured to store the instructions, when executed by the processor, causing the processor, when the at least one account includes a plurality of accounts, to generate a plurality of objects that respectively corresponds to the accounts.

According to various embodiments, the memory may be configured to store the instructions, when executed by the processor, causing the processor to output at least one of a scroll bar supporting scrolling the objects and a check box supporting selecting at least one of the accounts to the display.

According to various embodiments, the memory may be configured to store the instructions, when executed by the processor, causing the processor to group at least one of the objects based on a usage history with respect to the accounts.

According to various embodiments, the memory may be configured to store the instructions, when executed by the processor, causing the processor to transmit at least the portion of the data to the external electronic device when a portion of the grouped objects is selected such that the at least the portion of the data is shared with the sharing service to which the accounts respectively corresponding to the grouped objects are joined.

As described above, according to various embodiments, an electronic device (e.g., the electronic device 300) may include a display (e.g., the display 330), a communication module (e.g., the communication module 350) configured to communicate with an external electronic device, a memory (e.g., the memory 370), and a processor (e.g., the processor 310) configured to be operatively connected to the display, the communication module, and the memory, the memory storing instructions, the instructions, when executed by the processor, causing the processor to obtain data from the external electronic device, generate contents to share using template contents designated according to a type of the data and at least a portion of the data, and transmit the contents to share to a server providing a sharing service.

According to various embodiments, the data may include at least one of exercise information, processed data of the exercise information to be shared, and account information on an account joined to the sharing service.

According to various embodiments, the template contents may include an image or a map.

According to various embodiments, the memory may be configured to store the instructions, when executed by the processor, causing the processor to select the at least the portion of the data, which are used when generating the contents to share, based on priorities designated according to the type of the data.

According to various embodiments, the memory may be configured to store the instructions, when executed by the processor, causing the processor to analyze the data to verify the account information on the account joined to the sharing service, verify whether the account information is valid, and restrict the generation of the contents to share in a case that the account information is not valid.

According to various embodiments, the memory may be configured to store the instructions, when executed by the processor, causing the processor to determine whether the account information is valid based on an access validity period included in a token associated with the account information.

According to various embodiments, the memory may be configured to store the instructions, when executed by the processor, causing the processor to perform the generation of the contents to share in a background state.

As described above, according to various embodiments, an information processing system may include a first electronic device (e.g., the first electronic device 110) configured to collect data, a second electronic device (e.g., the second electronic device 130) configured to obtain at least a portion of the data from the first electronic device and process the at least the portion of the data, and a server (e.g., the server 150) configured to support a sharing service that obtains the processed data from the second electronic device and posts the processed data in a designated method. The second electronic device may be configured to transmit account information on at least one account joined to the sharing service to the first electronic device, and the first electronic device may be configured to analyze the account information to verify the at least one account, generate an object supporting posting the processed data on the sharing service, and output the object to a display of the first electronic device.

According to various embodiments, the data may include at least one of exercise information, the processed data of the exercise information to be shared, and the account information on the account joined to the sharing service.

According to various embodiments, the first electronic device may be configured to transmit the at least the portion of the data to the second electronic device when the object is selected.

According to various embodiments, the first electronic device may be a wearable electronic device, and the second electronic device may be a mobile electronic device paired with the first electronic device.

According to various embodiments, in a case that the first electronic device periodically synchronizes the data with the second electronic device, the first electronic device may be configured to generate an event associated with the at least the portion of the data and transmit the event to the second electronic device instead of transmitting the at least the portion of the data when the object is selected after completing the synchronization without new data being collected.

According to various embodiments, the event may include at least one of the account information, the object selection time, and identification information on the at least the portion of the data.

Figure 4:
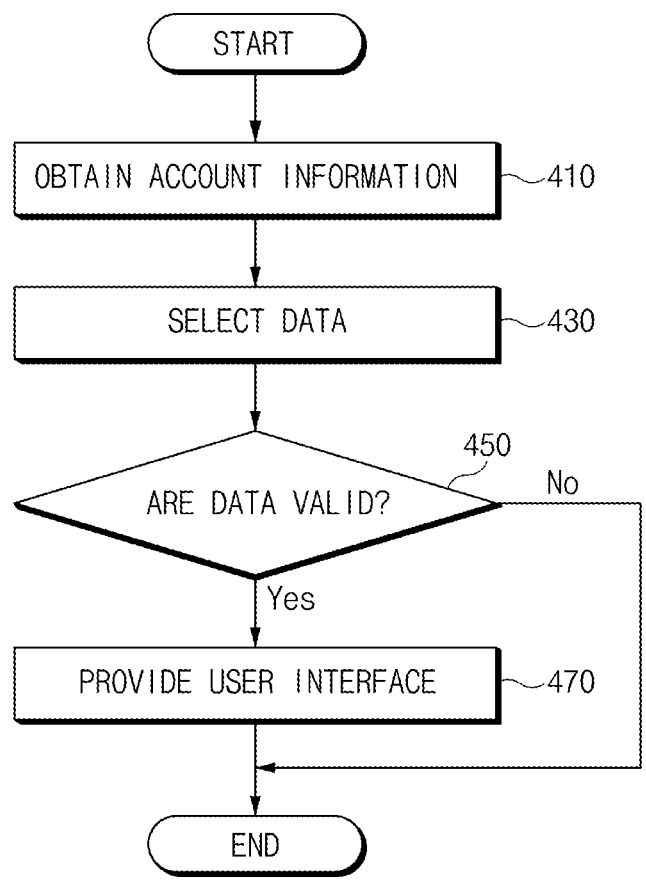
FIG. 4 illustrates an information processing method of the first electronic device shown in FIG. 2 according to an embodiment of the present disclosure.

FIG. 4 illustrates an information processing method of the first electronic device shown in FIG. 2 according to an embodiment of the present disclosure.

Referring to FIG. 4, an electronic device (e.g., the electronic device 200 of FIG. 2) may obtain the account information in operation 410. According to an embodiment, the electronic device may obtain the account information from an external electronic device (e.g., the electronic device 300 of FIG. 3). The account information may include information on at least one account joined to the sharing service. According to an embodiment, in a case that at least one account is not registered in the electronic device, the electronic device may perform operation 410, and in a case that the at least one account is registered in the electronic device, operation 410 may be omitted. In this regard, the electronic device may store the information associated with the account in the memory, and thus the account may be registered in the electronic device. According to various embodiments, the electronic device may register at least one account in the electronic device based on the account information and manage the registered account.

In operation 430, the electronic device may select at least a portion of data that are to be provided to the external electronic device. According to an embodiment, the electronic device may select minimum data required to share information. For instance, the electronic device may select only data designated according to the type of exercise among the exercise information. The data designated according to the type of exercise may include key data required to identify the type of exercise or data representing a feature of the exercise. As another example, the electronic device may select at least a portion of the data, which are to be provided to the external electronic device, based on the information for the data selection. The information for the data selection may include the information designated according to the user's preference or the information set by the user. According to an embodiment, the information for the data selection may be information received from the external electronic device.

In operation 450, the electronic device may determine whether the selected data are valid. According to an embodiment, the electronic device may determine whether the selected data are valid based on the type of exercise obtained by analyzing the selected data. As another example, the electronic device may determine whether the selected data are valid by verifying whether the data are selected based on the information for the data selection. As another way, the electronic device may determine whether the selected data are valid by verifying whether the selected data include the information associated with the security.

According to various embodiments, in the case that the selected data are valid, the electronic device may provide the user interface in operation 470. The electronic device may provide the user with the user interface to verify whether to share the information with the server (e.g., the server 150 of FIG. 1) providing the sharing service based on the account information. As an example, the electronic device may analyze the account information to verify the accounts joined to the sharing service and may generate the objects (e.g., buttons), which supports the user to select when the user agrees to share the information, in the same or similar number as that of the accounts to display the objects through the display.

According to various embodiments, in the case that the selected data are not valid, the electronic device may not provide the user interface. In addition, the electronic device may return to operation 430 to reselect the data in the case that the selected data are not valid.

According to various embodiments, the electronic device may not perform operation 450.

Figure 5:
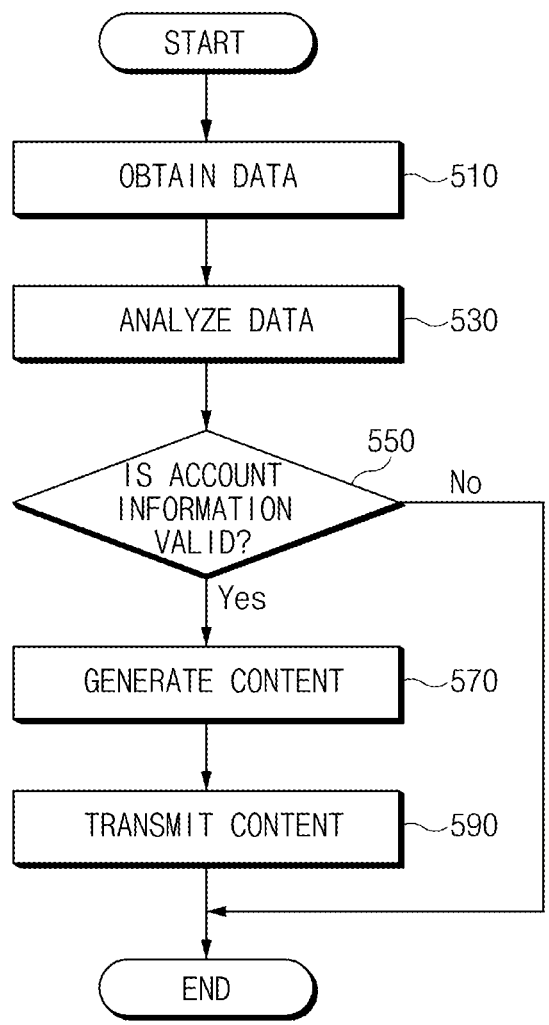
FIG. 5 illustrates an information processing method of the second electronic device shown in FIG. 3 according to an embodiment of the present disclosure.

FIG. 5 illustrates an information processing method of the second electronic device shown in FIG. 3 according to an embodiment of the present disclosure.

Referring to FIG. 5, the electronic device (e.g., the electronic device 300 of FIG. 3) may obtain data in operation 510. The electronic device may obtain the data associated with the information to share from the external electronic device (e.g., the electronic device 200 of FIG. 2). According to an embodiment, the electronic device may obtain at least a portion of data of the exercise information, which are to be shared, from the external electronic device.

In operation 530, the electronic device may analyze the obtained data. According to an embodiment, the electronic device may analyze the obtained data to determine the type of exercise. As another example, the electronic device may analyze the obtained data to verify the account information of the account to share the obtained data.

In operation 550, the electronic device may determine whether the account information is valid. According to an embodiment, the electronic device may verify whether the token associated with the account information is stored in the electronic device, and the electronic device may obtain the token from the server (e.g., the server 150 of FIG. 1) providing the sharing service in a case that the token is not stored. As an example, the electronic device may login to the server based on the account information and obtain the token including the login information from the server. The login information may include, for example, the access time, the access validity period, etc. Accordingly, the electronic device may determine whether the account information corresponding to the token is valid by verifying the access validity period.

According to various embodiments, in a case that the account information is valid, the electronic device may generate the content in operation 570. According to an embodiment, the electronic device may select the template content designated according to the type of exercise and generate the content to share using the selected template content and the analyzed result of the obtained data. The template content may include, for example, an image designated according to the type of exercise or a map. According to an embodiment, the electronic device may use at least a portion of the obtained data when the electronic device generates the content to share. In this case, the electronic device may select the at least a portion of the obtained data using the priorities designated according to the type of exercise.

In the case that the content to share is generated, the electronic device may transmit the generated content to the server in operation 590. According to various embodiments, in a case that the account information is not valid, the electronic device may omit performing operations 570 and 590.

According to various embodiments, the electronic device may perform operation 570 in a background. As an example, apart from performing operations 530 and 550, the electronic device may perform operation 570 in the background after performing operation 510.

According to various embodiments, the electronic device may verify whether the account information is valid and obtain the data in the case that the account information is valid. In addition, in the case where the account information is not valid, the electronic device may display the user interface through the display for the account activation (e.g., a login). The electronic device may analyze the data after obtaining the data, generate the content based on the data, and transmit the generated content to the server.

Figure 6:
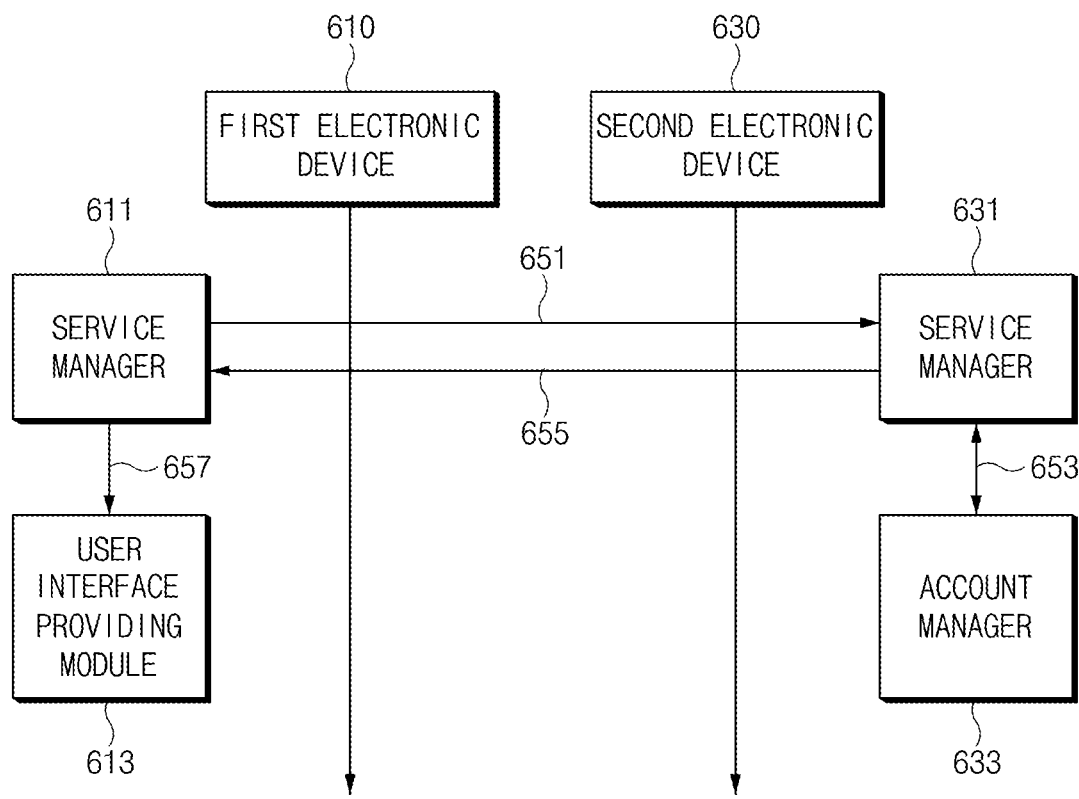
FIG. 6 illustrates a method of providing the user interface in the information processing system shown in FIG. 1 according to an embodiment of the present disclosure.

FIG. 6 illustrates a method of providing the user interface in the information processing system shown in FIG. 1 according to an embodiment of the present disclosure.

Referring to FIG. 6, the information processing system may include a first electronic device 610 and a second electronic device 630. The first electronic device 610 may be an electronic device (e.g., the electronic device 200 of FIG. 2) to provide the information, and the second electronic device 630 may be an electronic device (e.g., the electronic device 300 of FIG. 3) to share the information. According to an embodiment, the first electronic device 610 may be the wearable electronic device, and the second electronic device 630 may be the mobile electronic device paired with the wearable electronic device. For instance, the first electronic device 610 and the second electronic device 630 may be devices operated as the companion function.

The first electronic device 610 may obtain the account information from the second electronic device 630 to provide the user interface. According to an embodiment, a service manager 611 included in the first electronic device 610 may request the account information to a service manager 631 included in the second electronic device 630 in operation 651. For instance, the service manager 611 of the first electronic device 610 may transmit a request message for the account information to the service manager 631 of the second electronic device 630.

In the case that the request message for the account information is received, in operation 653, the service manager 631 of the second electronic device 630 may request the account information with respect to the account registered in the second electronic device 630 to the account manager 633 of the second electronic device 630, and the account manager 633 of the second electronic device 630 may transmit the account information to the service manager 631 of the second electronic device 630.

In the case that the account information is transmitted, the service manager 631 of the second electronic device 630 may transmit the account information to the service manager 611 of the first electronic device 610 in operation 655. For instance, the service manager 631 of the second electronic device 630 may transmit the response message including the account information to the service manager 611 of the first electronic device 610.

In the case that the account information is obtained, the service manager 611 of the first electronic device 610 may transmit the account information to a user interface providing module 613 of the first electronic device 610 in operation 657. According to an embodiment, the user interface providing module 613 of the first electronic device 610 may generate the objects (e.g., buttons), which receive the input from the user, in the same or similar number as that of the accounts included in the account information and display the generated objects through the display.

Figure 7:
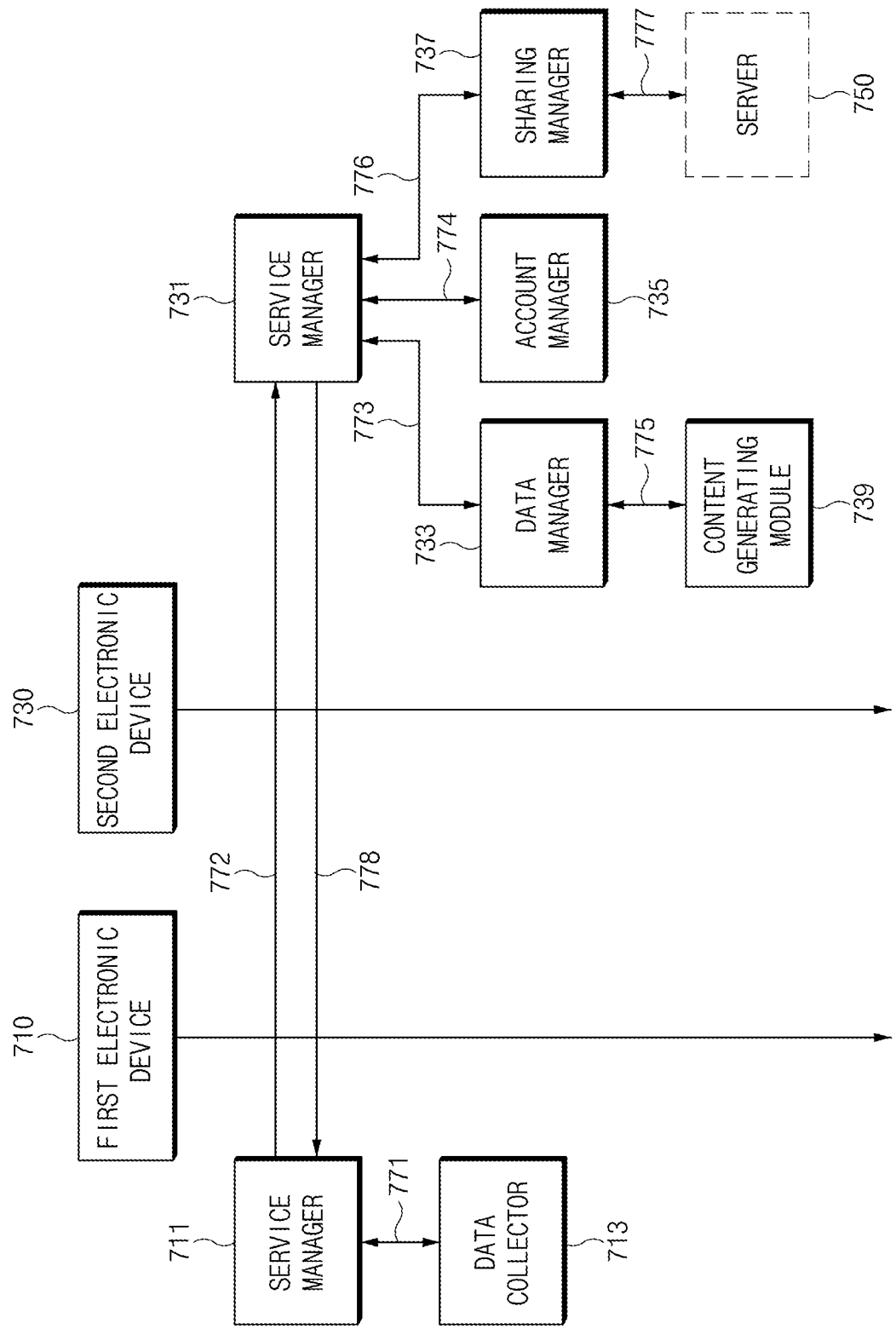
FIG. 7 illustrates a method of sharing the content in the information processing system shown in FIG. 1 according to an embodiment of the present disclosure.

FIG. 7 illustrates a method of sharing the content in the information processing system shown in FIG. 1 according to an embodiment of the present disclosure.

Referring to FIG. 7, the information processing system may include a first electronic device 710 and a second electronic device 730. The first electronic device 710 and the second electronic device 730 may have the same or similar structure as that of the first electronic device 610 and the second electronic device 630 shown in FIG. 6, respectively. For instance, the first electronic device 710 and the second electronic device 730 may be devices operated as the companion function.

The second electronic device 730 may obtain the data associated with the information to share from the first electronic device 710 to share the content. According to an embodiment, in operation 771, a service manager 711 of the first electronic device 710 may collect at least a portion of data of the information to share through a data collector 713 of the first electronic device 710.

In the case that the at least a portion of data of the information to share is collected, the service manager 711 of the first electronic device 710 may transmit the collected data to a service manager 731 of the second electronic device 730 in operation 772. For instance, the service manager 711 of the first electronic device 710 may transmit a sharing request message of the collected data to the service manager 731 of the second electronic device 730.

In the case that the collected data are obtained, the service manager 731 of the second electronic device 730 may determine whether the collected data are valid through a data manager 733 of the second electronic device 730 in operation 773. In a case that the collected data are valid, the service manager 731 of the second electronic device 730 may determine whether valid account information exist through an account manager 735 of the second electronic device 730 in operation 774. As an example, the service manager 731 of the second electronic device 730 may determine whether the account information included in the collected data is valid through the account manager 735 of the second electronic device 730.

In a case that the account information is valid, the data manager 733 of the second electronic device 730 may generate the content to share through a content generating module 739 of the second electronic device 730 in operation 775. According to an embodiment, the content generating module 739 of the second electronic device 730 may select the template content associated with the collected data and generate the content to share using the selected template content and the collected data. According to various embodiments, apart from performing operations 773 and 774, the second electronic device 730 may perform operation 775 in the background after performing operation 772.

In the case that the content to share is generated, the service manager 731 of the second electronic device 730 may transmit the content to share to a sharing manager 737 of the second electronic device 730 in operation 776. The sharing manager 737 of the second electronic device 730 may transmit the content to share to a server 750 in operation 15. The server 750 may provide the sharing service which is accessible with the account corresponding to the account information. When the content to share is shared in a designated way through the server 750, the server 750 may transmit the shared result to the second electronic device 730.

In the case that the shared result is received, the service manager 731 of the second electronic device 730 may transmit the shared result to the service manager 711 of the first electronic device 710 in operation 778. For instance, the service manager 731 of the second electronic device 730 may transmit the response message including the shared result to the service manager 711 of the first electronic device 710.

Figure 8A:
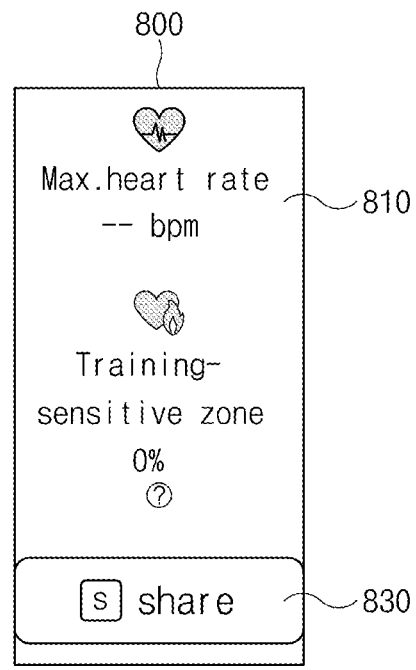
FIG. 8A illustrates a screen associated with the providing of the user interface based on the account information according to an embodiment of the present disclosure.
Figure 8B:
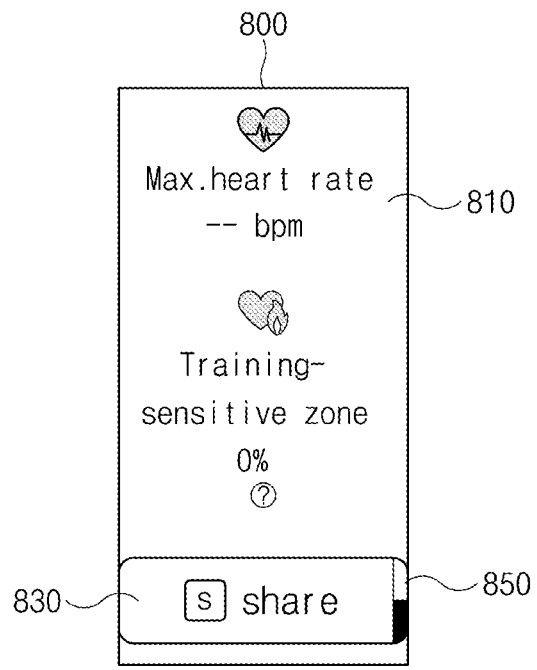
FIG. 8B illustrates a screen associated with providing the user interface based on a plurality of account information according to an embodiment of the present disclosure.

FIG. 8A illustrates a screen associated with providing the user interface based on the account information according to an embodiment of the present disclosure, and FIG. 8B illustrates a screen associated with providing the user interface based on a plurality of account information according to an embodiment of the present disclosure.

Referring to FIGS. 8A and 8B, an electronic device (e.g., the electronic device 200 of FIG. 2) may output an execution screen 800 of an application (e.g., the information providing application 290 of FIG. 2) through a display (e.g., the display 250 of FIG. 2). According to an embodiment, the electronic device may collect the exercise information on the exercise performed by the user based on a sensor module (e.g., the sensor module 230 of FIG. 2) and may output the execution screen 800 of the application including an object 810 (e.g., an image, a text, or the like) corresponding to at least a portion of the collected exercise information through the display.

According to various embodiments, the electronic device may obtain the account information from an external electronic device (e.g., the electronic device 300 of FIG. 3) and analyze the obtained account information. In the case that the account joined to the sharing service exists, the electronic device may display an object 830 (e.g., a button), which supports the user to select when the user agrees to share the information through the execution screen 800 of the application. Accordingly, in the case that the object 830 is selected, the electronic device may transmit at least a portion of data of the exercise information corresponding to the object 810 displayed through the execution screen 800 of the application to the external electronic device. In this case, the external electronic device may generate the content to share using the received data and transmit the generated content to the server supporting the sharing service in which a corresponding account is joined.

According to an embodiment, the object 830 may include a text or an image associated with the account. In addition, the object 830 may be generated in the same or similar number as that of the accounts. In a case that multiple objects 830 are generated, the electronic device may display an object 850 (e.g., a scroll bar) supporting a scroll function through the execution screen 800 of the application as shown in FIG. 8B. As another way, the electronic device may display an object (not shown) (e.g., a check box)

supporting to select at least one of the objects 830 through the execution screen 800 of the application.

According to various embodiments, the electronic device may allow multiple objects 830 corresponding to a frequently-used account to be grouped for displaying the objects 830 based on an account usage history. In a case where the objects 830, which are grouped, are selected, the electronic device may sequentially or simultaneously transmit corresponding data to the external electronic device to allow at least the portion of data of the exercise information to be shared with the sharing service in which the accounts respectively corresponding to the objects 830 are joined.

According to various embodiments, in the case that the objects 830 are displayed through the execution screen 800 of the application and at least one object 830 among the objects 830 is selected, the corresponding data may be transmitted to the external electronic device to allow at least the portion of data of the exercise information to be shared with the sharing service in which an account corresponding to the selected object 830 is joined.

As described above, the electronic device may display the object 830 supporting the user to select the information sharing when the user agrees to share the information. For instance, in the case that the object 830 is selected by the user, the data transmission/reception between the external electronic devices may be automatically performed without user intervention and performed in the background without disturbing other functions of the electronic device, and thus inconveniences caused when sharing information may be solved.

Figure 9:
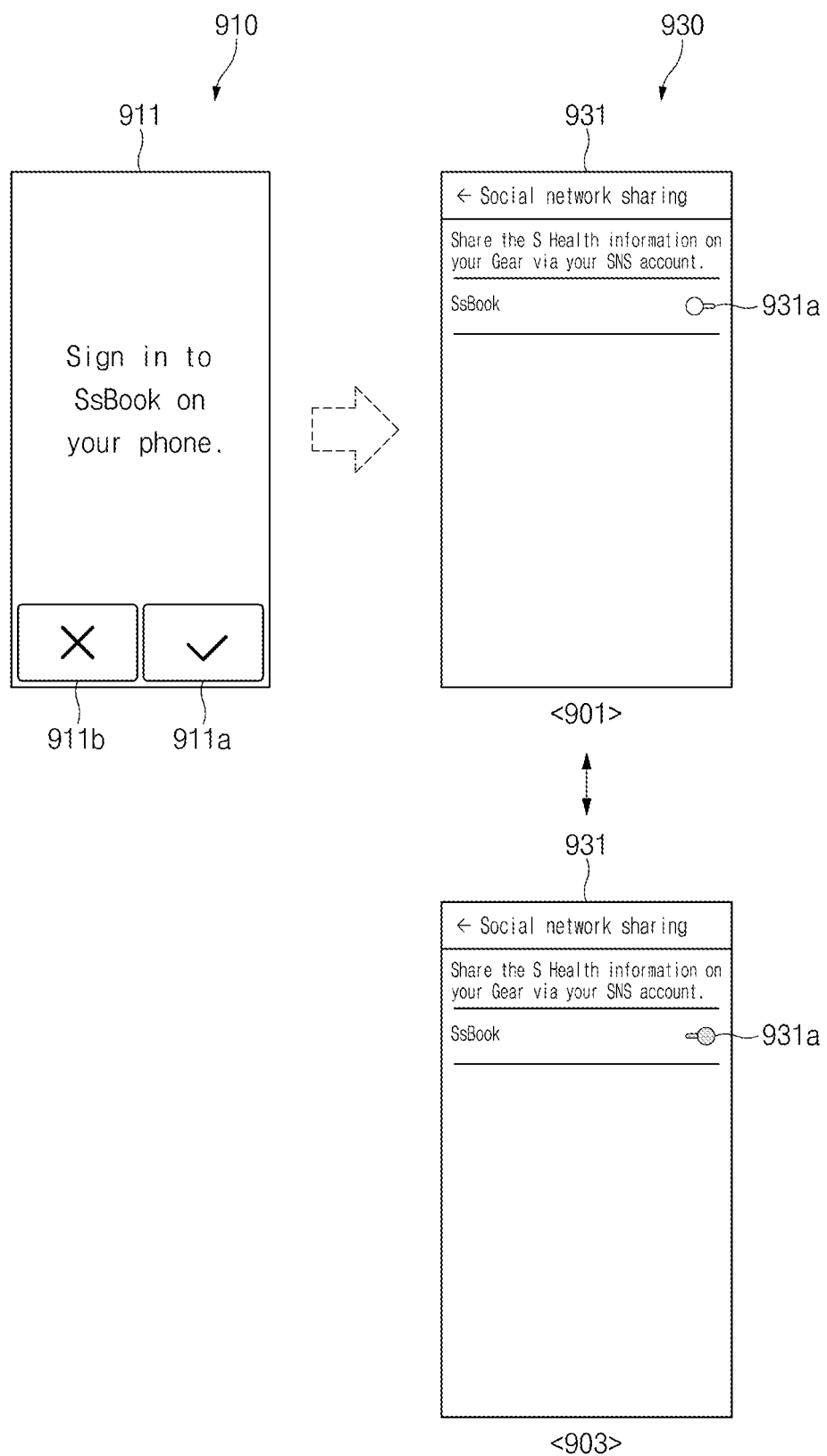
FIG. 9 illustrates a method of activating an account according to an embodiment of the present disclosure.

FIG. 9 illustrates a method of activating an account according to an embodiment of the present disclosure.

Referring to FIG. 9, a first electronic device 910 (e.g., the electronic device 200 of FIG. 2) may output an execution screen 911 of an application (e.g., the information providing application 290 of FIG. 2) through a display (e.g., the display 250 of FIG. 2). According to an embodiment, the first electronic device 910 may obtain account information from a second electronic device 930 (e.g., the electronic device 300 of FIG. 3) and analyze the obtained account information to determine whether an account joined to the sharing service exists. In a case that the account joined to the sharing service exists, the first electronic device 910 may transmit at least a portion of data of the information to the second electronic device 930 to share the information with the sharing service to which the account is joined.

According to an embodiment, in a case that a corresponding account is in an inactivation state (e.g., a log-out state), the first electronic device 910 may display an object (e.g., a text, an image, or the like) through the execution screen 911 of the application to indicate that the corresponding account is in the inactivation state. In addition, the first electronic device 910 may display an object 911*a* (e.g., a button) supporting to activate the corresponding account or an object 911*b* (e.g., a button) supporting to cancel the information sharing through the execution screen 911 of the application.

In a case that the object 911*b* supporting to cancel the information sharing is selected, the first electronic device 910 may restore the execution screen 911 of the application to a previous state. For instance, the first electronic device 910 may remove the object indicating that the corresponding account is in the inactivation state from the execution screen 911 of the application.

In the case that the object 911*a* supporting to activate the corresponding account is selected, the first electronic device 910 may transmit an activation request message of the corresponding account to the second electronic device 930. In this case, the second electronic device 930 may output a screen 931 supporting to set an activation state of the account through a display (e.g., the display 330 of FIG. 3) as shown in a first state 901. The screen 931 supporting to set the activation state of the account may include an object 931*a* (e.g., a toggle button) supporting to activate or deactivate the account. The first state 901 represents the deactivated state of the account, and a second state 903 represents the activated state of the account. The second electronic device 930 may be switched to the first state 901 or the second state 903 in response to a selection of the object 931*a* supporting to activate or deactivate the account. According to an embodiment, the screen 931 supporting to set the activation state of the account may be an execution screen of some functions of the application (e.g., the information sharing application 390 of FIG. 3).

As described above, the process of setting the account state may be simplified through an interlinking between the first electronic device 910 and the second electronic device 930 and an automatic screen switching.

Figure 10:
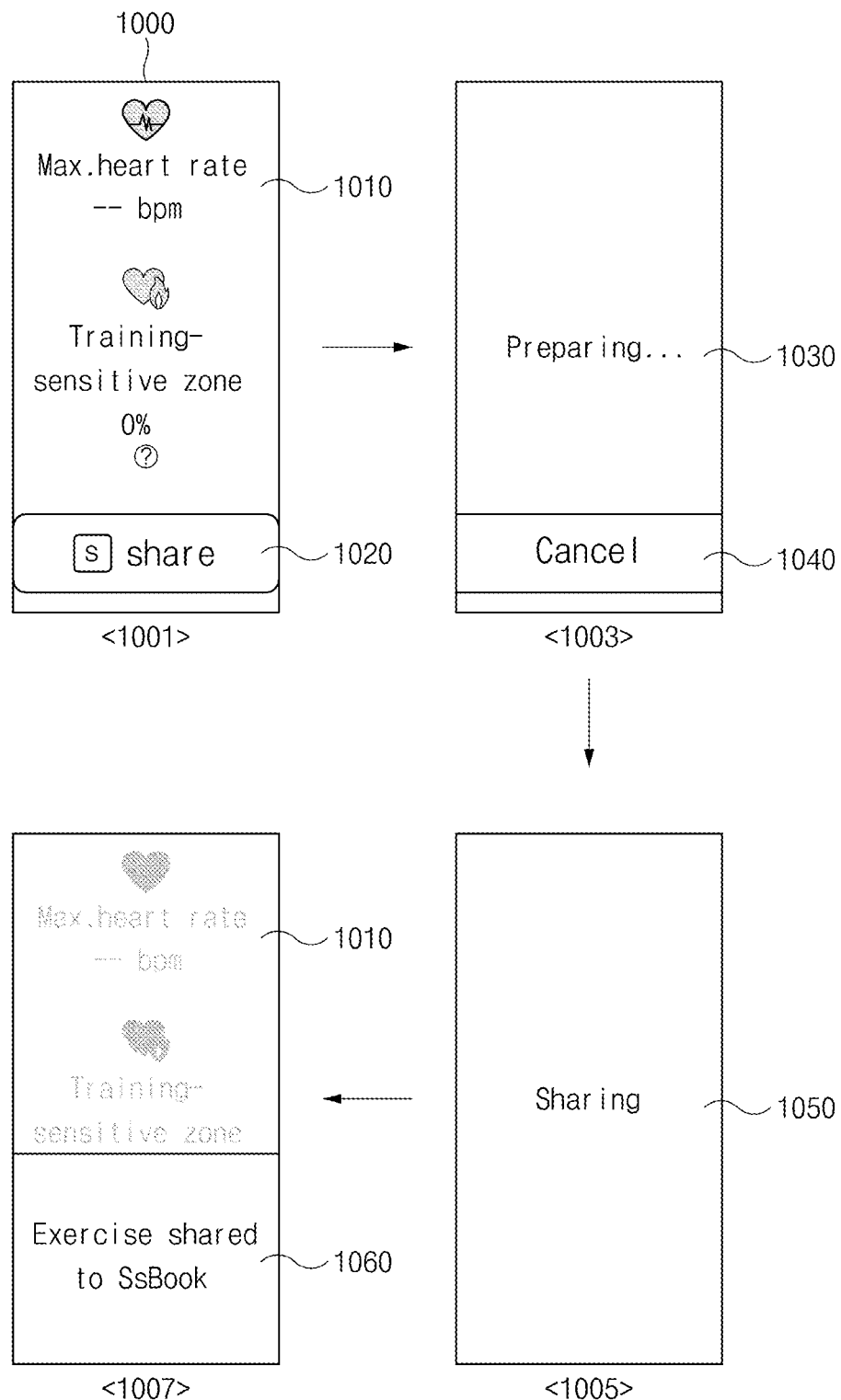
FIG. 10 illustrates a screen associated with an information processing operation of the first electronic device shown in FIG. 2 according to an embodiment of the present disclosure.

FIG. 10 illustrates a screen associated with an information processing operation of the first electronic device shown in FIG. 2 according to an embodiment of the present disclosure.

Referring to FIG. 10, an electronic device (e.g., the electronic device 200 of FIG. 2) may output an execution screen 1000 of an application (e.g., the information providing application 290 of FIG. 2) through a display (e.g., the display 250 of FIG. 2) as shown in a first state 1001. According to an embodiment, the electronic device may collect the exercise information on the exercise performed by the user based on the sensor module (e.g., the sensor module 230 of FIG. 2) and output the execution screen 1000 of the application including an object 1010 (e.g., an image, a text, or the like) corresponding to at least a portion of the collected exercise information to the display. In addition, the electronic device may obtain the account information from an external electronic device (e.g., the electronic device 300 of FIG. 3) and analyze the obtained account information, and in a case that the account joined to the sharing service exists, the electronic device may display an object 1020 (e.g., a button), which supports the user to select when the user agrees to share the information, through the execution screen 1000 of the application.

According to an embodiment, in the case that the object 1020 is selected, the electronic device may transmit at least a portion of data of the exercise information corresponding to the object 1010 displayed through the execution screen 1000 of the application to the external electronic device. In this case, the electronic device may display an object 1030 (e.g., an image, a text, or the like) indicating a data transfer ready state through the execution screen 1000 of the application as shown in a second state 1003. The data transfer ready state may include, for example, a state that determines whether the account information is valid. In addition, the electronic device may display an object 1040 (e.g., a button) supporting to cancel the information sharing through the execution screen 1000 of the application.

When the data transfer is ready (e.g., in a case that it is determined that the account information is valid), the electronic device may display an object 1050 (e.g., an image, a text, or the like) indicating a data transfer state through the execution screen 1000 of the application as shown in a third state 1005. According to an embodiment, the electronic device may omit displaying the second state 1003. For instance, the electronic device may not display the object 1030 indicating the data transfer ready state in the execution screen 1000 of the application.

In a case that the data transfer is completed, the electronic device may display an object 1060 (e.g., a popup object) indicating that the data transfer is completed through the execution screen 1000 of the application as shown in a fourth state 1007. According to an embodiment, in a case that a predetermined time elapses or the user input occurs after the object 1060 indicating the completion of the data transfer is displayed, the electronic device may terminate displaying the object 1060.

According to various embodiments, the electronic device may collect the data corresponding to a plurality of the exercise information and transmit the data all at once to the external electronic device instead of transmitting the data corresponding to the exercise information to the external electronic device in response to the selection of the object 1020 associated with the information sharing. As an example, in a case that the object 1020 associated with the information sharing is selected while a communication between the electronic device and the external electronic device is not working, the electronic device may store the data to be transmitted in the memory and sequentially and simultaneously transmit the data stored in the memory after the communication between the electronic device and the external electronic device is connected.

According to various embodiments, the electronic device may automatically transmit the data corresponding to the exercise information to the external electronic device without selecting the object 1020 associated with the information sharing of. According to an embodiment, the electronic device may transmit the data corresponding to the exercise information to the external electronic device based on biometric information of the user and predetermined information. As an example, in cases that an exercise result includes an exercise reward, heart rate information during exercise exceeds a reference value, the exercise is carried out in a new place, or a photo file stored during exercise exists, the electronic device may automatically transmit the data corresponding to the exercise information to the external electronic device without selecting the object 1020 associated with the information sharing.

According to various embodiments, in a case that the electronic device synchronizes the exercise information with the external electronic device, the electronic device may not transmit the data corresponding to the exercise information to the external electronic device when the object 1020 associated with the information sharing is selected after completing the synchronization without new information being collected. In this case, the electronic device may generate an event associated with the data corresponding to the exercise information and transmit the generated event to the electronic device. The event associated with the data corresponding to the exercise information may include, for example, account information, time information at which the object 1020 is selected, or identification information of the information to share.

Figure 11:
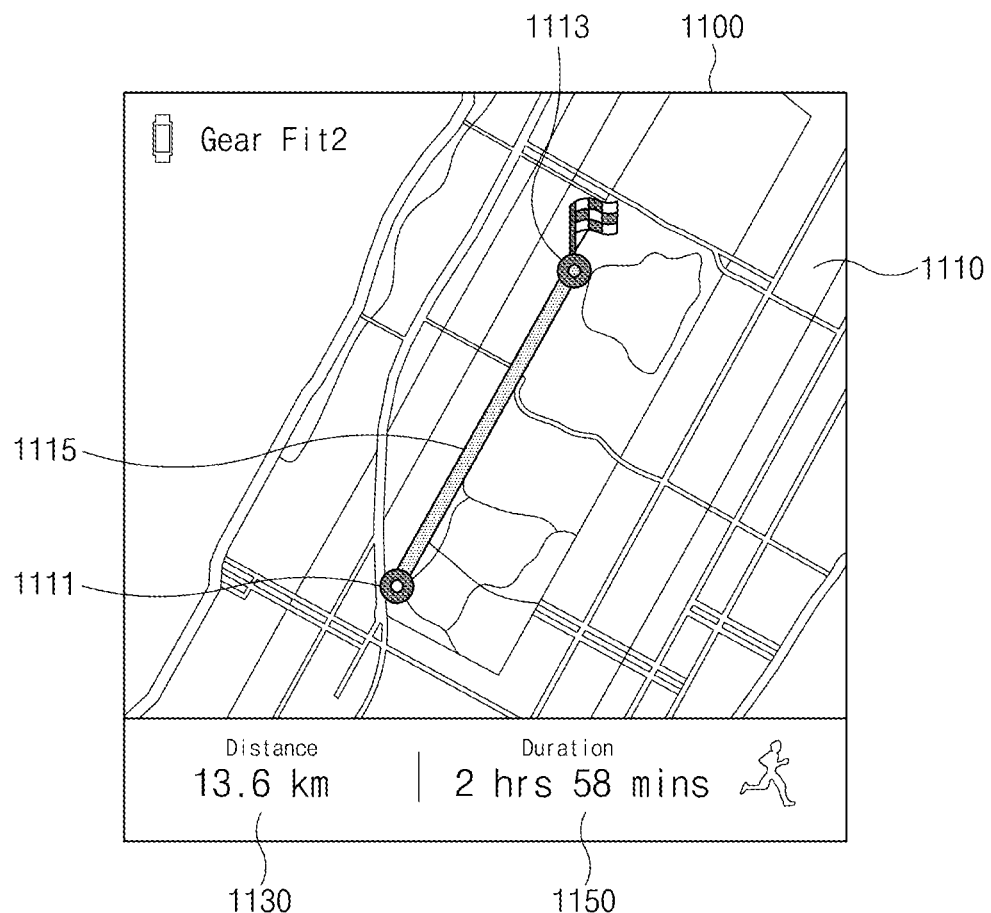
FIG. 11 illustrates a screen associated with the generation of the content of the second electronic device shown in FIG. 3 according to an embodiment of the present disclosure.

FIG. 11 illustrates a screen associated with the generation of the content of the second electronic device shown in FIG. 3 according to an embodiment of the present disclosure.

Referring to FIG. 11, an electronic device (e.g., the electronic device 300 of FIG. 3) may generate content 1100 (e.g., an image) to share using the data received from an external electronic device (e.g., the electronic device 200 of FIG. 2). According to an embodiment, the electronic device may analyze the received data and select at least one template content 1110 (e.g., an image, a map, or the like) based on the analyzed result. As an example, the electronic device may select the at least one template content 1110 among a plurality of template contents 1110 divided according to the type of exercise.

According to an embodiment, the electronic device may generate the content 1100 to share using the selected template content 1110 and the received data. As an example, the electronic device may generate the content 1100 to share using the selected template content 1110 and objects corresponding to at least a portion of the received data. FIG. 11 shows the state in which the electronic device generates the content 1100 to share by selecting a map as the template content 1110, displaying an object 1111 corresponding to an exercise starting position, an object 1113 corresponding to an exercise ending position, and an object 1115 corresponding to a path of exercise on the selected map, and displaying an object 1130 corresponding to the exercise distance and an object 1150 corresponding to the exercise time on a lower portion of the map.

Figure 12:
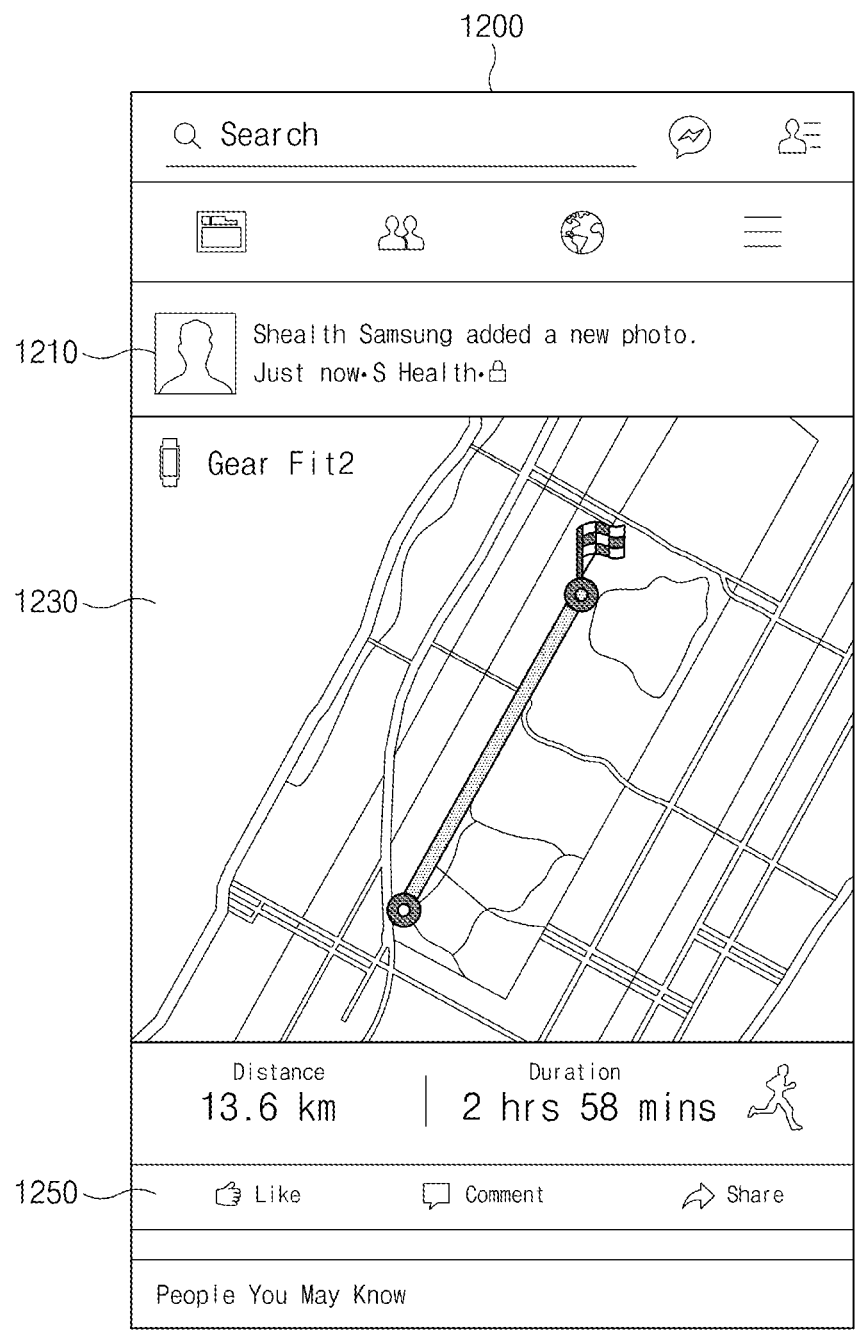
FIG. 12 illustrates a screen of the shared content provided by the server according to an embodiment of the present disclosure.

FIG. 12 illustrates a screen of the shared content provided by the server according to an embodiment of the present disclosure.

Referring to FIG. 12, an electronic device (e.g., the electronic device 300 of FIG. 3) may transmit content 1230 (e.g., the content 1100 of FIG. 11) to share to a server (e.g., the server 150 of FIG. 1). The server may support a user of another external electronic device to view corresponding content 1230 by a predetermined method, e.g., posting the corresponding content 1230 transmitted thereto on a web page 1200.

According to an embodiment, the web page 1200 may further include sharing history information 1210 of the content 1230 or a function button 1250. The sharing history information 1210 of the content 1230 may include, for example, user identification information (e.g., a user name, a user ID, or the like) or a sharing time of the content 1230. The function button 1250 may support at least one function, such as a function for registering an evaluation on information, a function for writing a comment, a sharing function, etc., which is provided by the sharing service.

Figure 13:
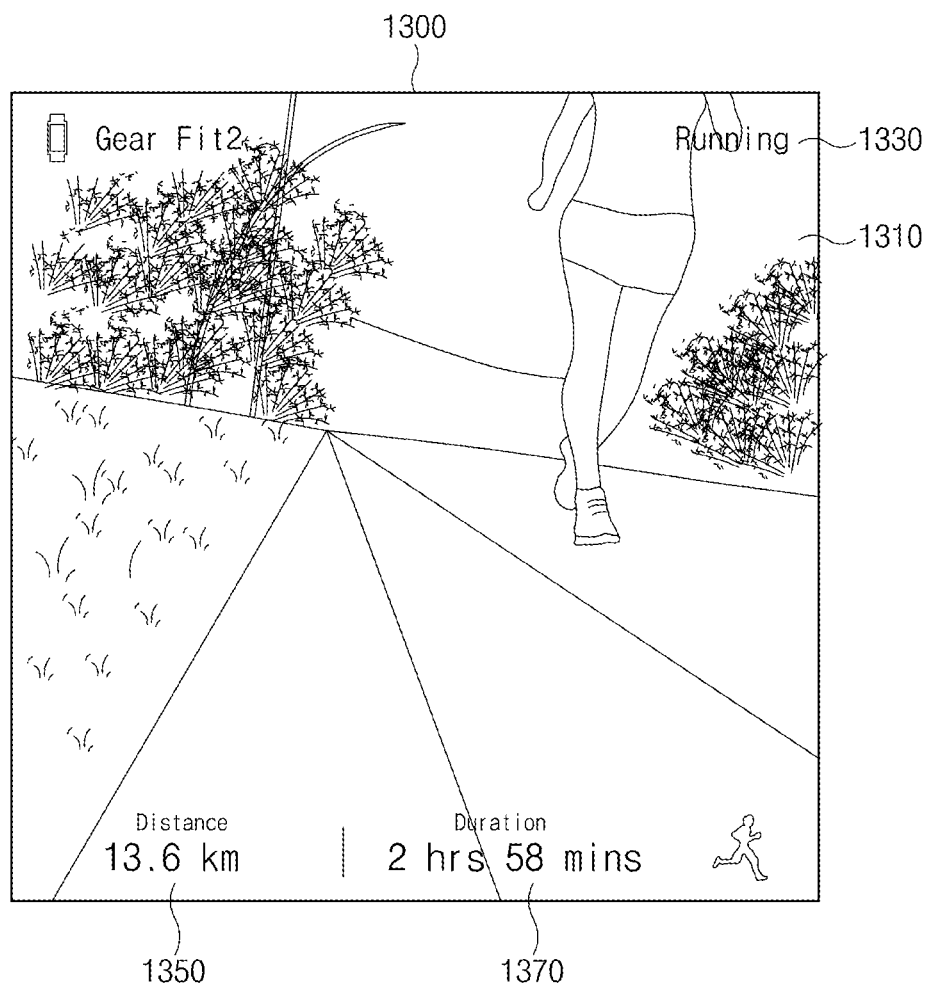
FIG. 13 illustrates a screen associated with generating other types of content of the second electronic device shown in FIG. 3 according to an embodiment of the present disclosure.
Figure 14:
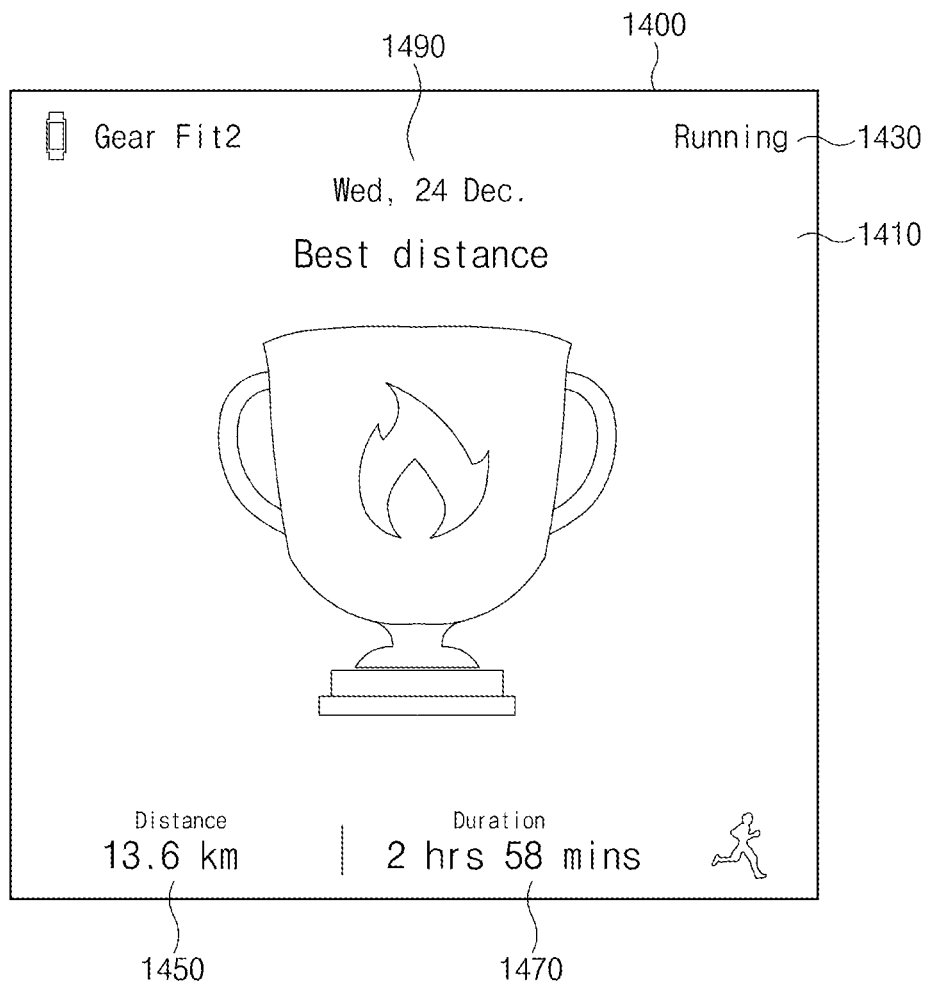
FIG. 14 illustrates a screen associated with generating other types of content of the second electronic device shown in FIG. 3 according to an embodiment of the present disclosure.

FIG. 13 illustrates a screen associated with generating other types of content of the second electronic device shown in FIG. 3 according to an embodiment of the present disclosure, and FIG. 14 illustrates a screen associated with generating other types of content of the second electronic device shown in FIG. 3 according to an embodiment of the present disclosure.

Referring to FIGS. 13 and 14, an electronic device (e.g., the electronic device 300 of FIG. 3) may generate contents 1300 and 1400 (e.g., images) to share using data received from an external electronic device (e.g., the electronic device 200 of FIG. 2) with the same or similar method as that of the electronic device of FIG. 11. According to an embodiment, the electronic device may analyze the received data and select at least one template content 1310 and 1410 (e.g., images) based on the analyzed result.

FIG. 13 shows a state in which the electronic device selects the image associated with the type of exercise as the template content 1310, and FIG. 14 shows a state in which the electronic device selects the image associated with the exercise result information as the template content 1410. In addition, the electronic device may generate the contents 1300 and 1400 to share using the selected template contents 1310 and 1410 and the received data. FIG. 13 shows a state in which the electronic device generates the content 1300 to share by including an object 1330 corresponding to the type of exercise, an object 1350 corresponding to the exercise distance, and an object 1370 corresponding to the exercise time in the template content 1310, and FIG. 14 shows a state in which the electronic device generates the content 1400 to share by including an object 1430 corresponding to the type of exercise, an object 1450 corresponding to the exercise distance, an object 1470 corresponding to the exercise time, and an object 1490 corresponding to the exercise reward in the template content 1410.

Figure 15:
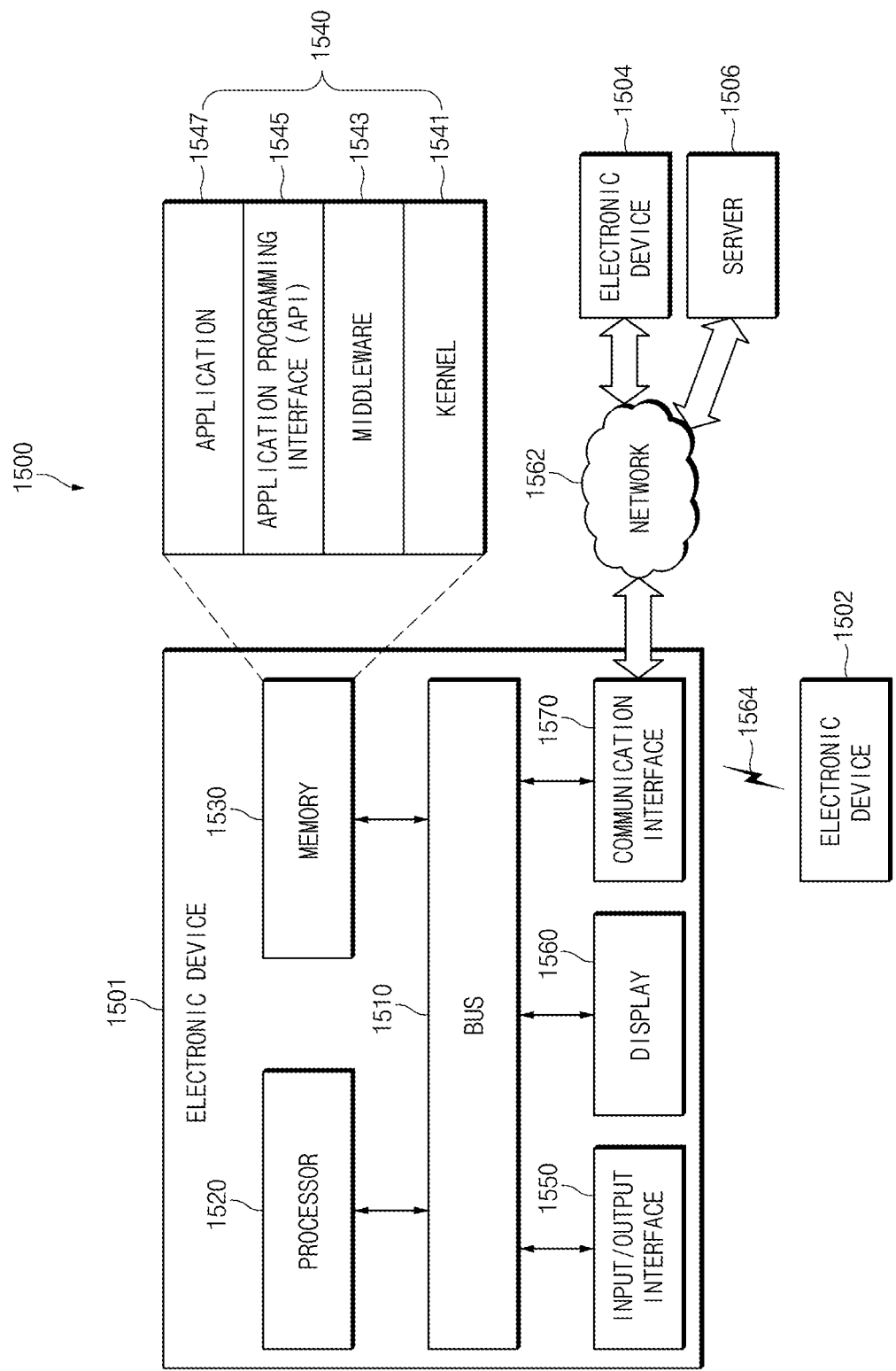
FIG. 15 illustrates an electronic device in a network environment according to an embodiment of the present disclosure.

FIG. 15 illustrates an electronic device in a network environment according to an embodiment of the present disclosure.

An electronic device 1501 in a network environment 1500 according to various embodiments of the present disclosure will be described with reference to FIG. 15. The electronic device 1501 may include a bus 1510, a processor 1520, a memory 1530, an input/output interface 1550, a display 1560, and a communication interface 1570. In various embodiments of the present disclosure, at least one of the foregoing elements may be omitted or another element may be added to the electronic device 1501.

The bus 1510 may include a circuit for connecting the above-mentioned elements 1510 to 1570 to each other and transferring communications (e.g., control messages and/or data) among the above-mentioned elements.

The processor 1520 may include at least one of a central processing unit (CPU), an application processor (AP), or a communication processor (CP). The processor 1520 may perform data processing or an operation related to communication and/or control of at least one of the other elements of the electronic device 1501.

The memory 1530 may include a volatile memory and/or a nonvolatile memory. The memory 1530 may store instructions or data related to at least one of the other elements of the electronic device 1501. According to an embodiment of the present disclosure, the memory 1530 may store software and/or a program 1540. The program 1540 may include, for example, a kernel 1541, a middleware 1543, an application programming interface (API) 1545, and/or an application program (or an application) 1547. At least a portion of the kernel 1541, the middleware 1543, or the API 1545 may be referred to as an operating system (OS).

The kernel 1541 may control or manage system resources (e.g., the bus 1510, the processor 1520, the memory 1530, or the like) used to perform operations or functions of other programs (e.g., the middleware 1543, the API 1545, or the application program 1547). Furthermore, the kernel 1541 may provide an interface for allowing the middleware 1543, the API 1545, or the application program 1547 to access individual elements of the electronic device 1501 in order to control or manage the system resources.

The middleware 1543 may serve as an intermediary so that the API 1545 or the application program 1547 communicates and exchanges data with the kernel 1541.

Furthermore, the middleware 1543 may handle one or more task requests received from the application program 1547 according to a priority order. For example, the middleware 1543 may assign at least one application program 1547 a priority for using the system resources (e.g., the bus 1510, the processor 1520, the memory 1530, or the like) of the electronic device 1501. For example, the middleware 1543 may handle the one or more task requests according to the priority assigned to the at least one application, thereby performing scheduling or load balancing with respect to the one or more task requests.

The API 1545, which is an interface for allowing the application 1547 to control a function provided by the kernel 1541 or the middleware 1543, may include, for example, at least one interface or function (e.g., instructions) for file control, window control, image processing, character control, or the like.

The input/output interface 1550 may serve to transfer an instruction or data input from a user or another external device to (an)other element(s) of the electronic device 1501. Furthermore, the input/output interface 1550 may output instructions or data received from (an)other element(s) of the electronic device 1501 to the user or another external device.

The display 1560 may include, for example, a liquid crystal display (LCD), a light-emitting diode (LED) display, an organic light-emitting diode (OLED) display, a microelectromechanical systems (MEMS) display, or an electronic paper display. The display 1560 may present various content (e.g., a text, an image, a video, an icon, a symbol, or the like) to the user. The display 1560 may include a touch screen, and may receive a touch, gesture, proximity or hovering input from an electronic pen or a part of a body of the user.

The communication interface 1570 may set communications between the electronic device 1501 and an external device (e.g., a first external electronic device 1502, a second external electronic device 1504, or a server 1506). For example, the communication interface 1570 may be connected to a network 1562 via wireless communications or wired communications so as to communicate with the external device (e.g., the second external electronic device 1504 or the server 1506).

The wireless communications may employ at least one of cellular communication protocols such as long-term evolution (LTE), LTE-advance (LTE-A), code division multiple access (CDMA), wideband CDMA (WCDMA), universal mobile telecommunications system (UMTS), wireless broadband (WiBro), or global system for mobile communications (GSM). The wireless communications may include, for example, a short-range communications 1564. The short-range communications may include at least one of wireless fidelity (Wi-Fi), Bluetooth, near field communication (NFC), magnetic stripe transmission (MST), or GNSS.

The MST may generate pulses according to transmission data and the pulses may generate electromagnetic signals. The electronic device 1501 may transmit the electromagnetic signals to a reader device such as a POS (point of sales) device. The POS device may detect the magnetic signals by using a MST reader and restore data by converting the detected electromagnetic signals into electrical signals.

The GNSS may include, for example, at least one of global positioning system (GPS), global navigation satellite system (GLONASS), BeiDou navigation satellite system (BEIDOU), or GALILEO, the European global satellite-based navigation system according to a use area or a bandwidth. Hereinafter, the term "GPS" and the term "GNSS" may be interchangeably used. The wired communications may include at least one of universal serial bus (USB), high definition multimedia interface (HDMI), recommended standard 232 (RS-232), plain old telephone service (POTS), or the like. The network 1562 may include at least one of telecommunications networks, for example, a computer network (e.g., local area network (LAN) or wide area network (WAN)), the Internet, or a telephone network.

The types of the first external electronic device 1502 and the second external electronic device 1504 may be the same as or different from the type of the electronic device 1501. According to an embodiment of the present disclosure, the server 1506 may include a group of one or more servers. A portion or all of operations performed in the electronic device 1501 may be performed in one or more other electronic devices (e.g., the first electronic device 1502, the second external electronic device 1504, or the server 1506). When the electronic device 1501 should perform a certain function or service automatically or in response to a request, the electronic device 1501 may request at least a portion of functions related to the function or service from another device (e.g., the first electronic device 1502, the second external electronic device 1504, or the server 1506) instead of or in addition to performing the function or service for itself. The other electronic device (e.g., the first electronic device 1502, the second external electronic device 1504, or the server 1506) may perform the requested function or additional function, and may transfer a result of the performance to the electronic device 1501. The electronic device 1501 may use a received result itself or additionally process the received result to provide the requested function or service. To this end, for example, a cloud computing technology, a distributed computing technology, or a client-server computing technology may be used.

Figure 16:
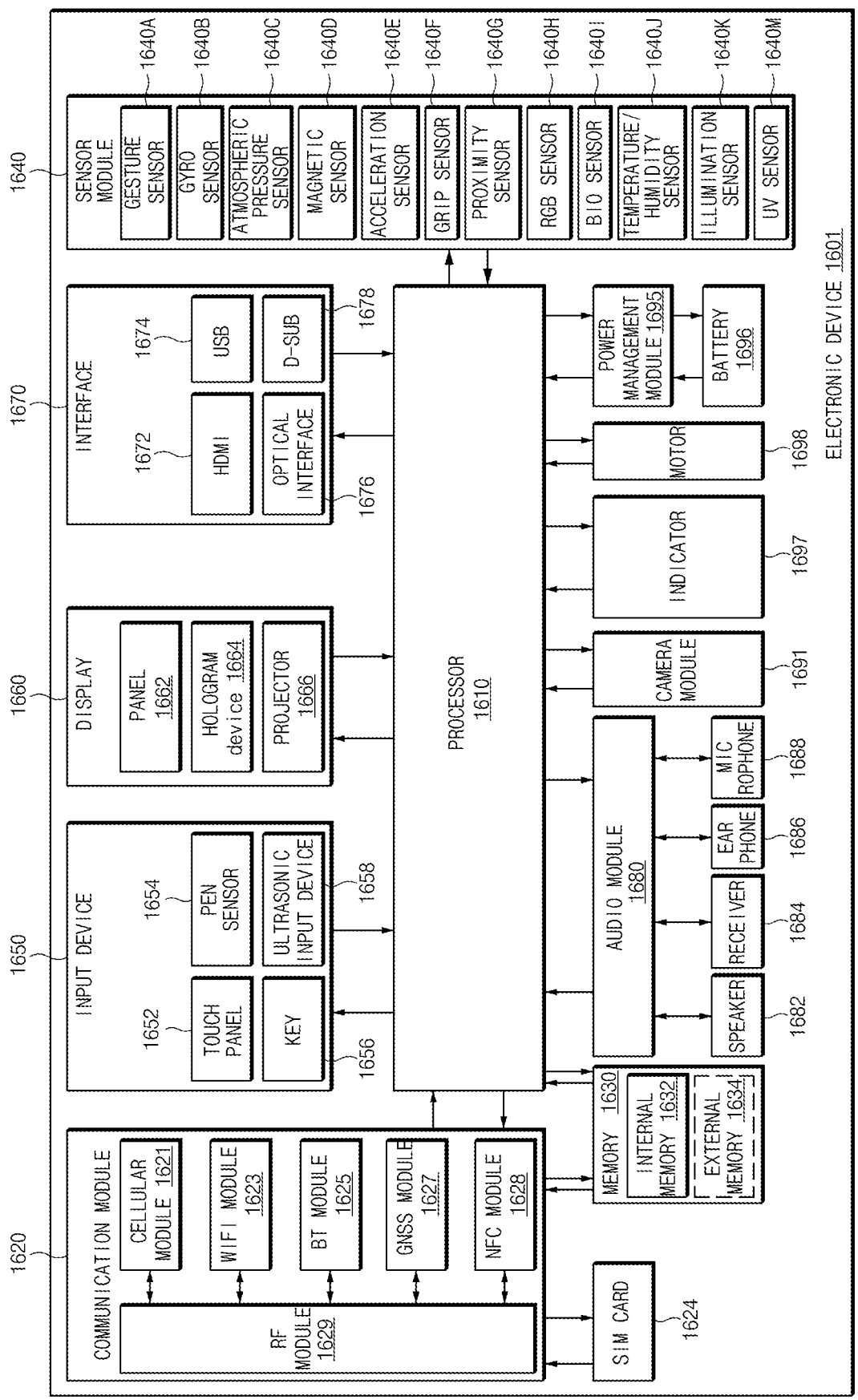
FIG. 16 illustrates an electronic device according to an embodiment of the present disclosure.

FIG. 16 illustrates an electronic device according to an embodiment of the present disclosure.

Referring to FIG. 16, an electronic device 1601 may include, for example, a part or the entirety of the electronic device 1501 illustrated in FIG. 15. The electronic device 1601 may include at least one processor (e.g., AP) 1610, a communication module 1620, a subscriber identification module (SIM) 1624, a memory 1630, a sensor module 1640, an input device 1650, a display 1660, an interface 1670, an audio module 1680, a camera module 1691, a power management module 1695, a battery 1696, an indicator 1697, and a motor 1698.

The processor 1610 may run an operating system or an application program so as to control a plurality of hardware or software elements connected to the processor 1610, and may process various data and perform operations. The processor 1610 may be implemented with, for example, a system on chip (SoC). According to an embodiment of the present disclosure, the processor 1610 may further include a graphic processing unit (GPU) and/or an image signal processor. The processor 1610 may include at least a portion (e.g., a cellular module 1621) of the elements illustrated in FIG. 16. The processor 1610 may load, on a volatile memory, an instruction or data received from at least one of other elements (e.g., a nonvolatile memory) to process the instruction or data, and may store various data in a nonvolatile memory.

The communication module 1620 may have a configuration that is the same as or similar to that of the communication interface 1570 of FIG. 15. The communication module 1620 may include, for example, a cellular module 1621, a Wi-Fi module 1623, a Bluetooth (BT) module 1625, a GNSS module 1627 (e.g., a GPS module, a GLONASS module, a BeiDou module, or a Galileo module), a NFC module 1628, and a radio frequency (RF) module 1629.

The cellular module 1621 may provide, for example, a voice call service, a video call service, a text message service, or an Internet service through a communication network. The cellular module 1621 may identify and authenticate the electronic device 1601 in the communication network using the subscriber identification module 1624 (e.g., a SIM card). The cellular module 1621 may perform at least a part of functions that may be provided by the processor 1610. The cellular module 1621 may include a communication processor (CP).

Each of the Wi-Fi module 1623, the Bluetooth module 1625, the GNSS module 1627 and the NFC module 1628 may include, for example, a processor for processing data transmitted/received through the modules. According to some various embodiments of the present disclosure, at least a part (e.g., two or more) of the cellular module 1621, the Wi-Fi module 1623, the Bluetooth module 1625, the GNSS module 1627, and the NFC module 1628 may be included in a single integrated chip (IC) or IC package.

The RF module 1629 may transmit/receive, for example, communication signals (e.g., RF signals). The RF module 1629 may include, for example, a transceiver, a power amp module (PAM), a frequency filter, a low noise amplifier (LNA), an antenna, or the like. According to another embodiment of the present disclosure, at least one of the cellular module 1621, the Wi-Fi module 1623, the Bluetooth module 1625, the GNSS module 1627, or the NFC module 1628 may transmit/receive RF signals through a separate RF module.

The SIM 1624 may include, for example, an embedded SIM and/or a card containing the subscriber identity module, and may include unique identification information (e.g., an integrated circuit card identifier (ICCID)) or subscriber information (e.g., international mobile subscriber identity (IMSI)).

The memory 1630 (e.g., the memory 1530) may include, for example, an internal memory 1632 or an external memory 1634. The internal memory 1632 may include at least one of a volatile memory (e.g., a dynamic RAM (DRAM), a static RAM (SRAM), a synchronous dynamic RAM (SDRAM), or the like), a nonvolatile memory (e.g., a one-time programmable ROM (OTPROM), a programmable ROM (PROM), an erasable and programmable ROM (EPROM), an electrically erasable and programmable ROM (EEPROM), a mask ROM, a flash ROM, a flash memory (e.g., a NAND flash memory, a NOR flash memory, or the like)), a hard drive, or a solid state drive (SSD).

The external memory 1634 may include a flash drive such as a compact flash (CF), a secure digital (SD), a Micro-SD, a Mini-SD, an extreme digital (xD), a MultiMediaCard (MMC), a memory stick, or the like. The external memory 1634 may be operatively and/or physically connected to the electronic device 1601 through various interfaces.

The sensor module 1640 may, for example, measure physical quantity or detect an operation state of the electronic device 1601 so as to convert measured or detected information into an electrical signal. The sensor module 1640 may include, for example, at least one of a gesture sensor 1640A, a gyro sensor 1640B, a barometric pressure sensor 1640C, a magnetic sensor 1640D, an acceleration sensor 1640E, a grip sensor 1640F, a proximity sensor 1640G, a color sensor 1640H (e.g., a red/green/blue (RGB) sensor), a biometric sensor 1640I, a temperature/humidity sensor 1640J, an illumination sensor 1640K, or an ultraviolet (UV) sensor 1640M. Additionally or alternatively, the sensor module 1640 may include, for example, an olfactory sensor (E-nose sensor), an electromyography (EMG) sensor, an electroencephalogram (EEG) sensor, an electrocardiogram (ECG) sensor, an infrared (IR) sensor, an iris recognition sensor, and/or a fingerprint sensor. The sensor module 1640 may further include a control circuit for controlling at least one sensor included therein. In some various embodiments of the present disclosure, the electronic device 1601 may further include a processor configured to control the sensor module 1640 as a part of the processor 1610 or separately, so that the sensor module 1640 is controlled while the processor 1610 is in a sleep state.

The input device 1650 may include, for example, a touch panel 1652, a (digital) pen sensor 1654, a key 1656, or an ultrasonic input device 1658. The touch panel 1652 may employ at least one of capacitive, resistive, infrared, and ultraviolet sensing methods. The touch panel 1652 may further include a control circuit. The touch panel 1652 may further include a tactile layer so as to provide a haptic feedback to a user.

The (digital) pen sensor 1654 may include, for example, a sheet for recognition which is a part of a touch panel or is separate. The key 1656 may include, for example, a physical button, an optical button, or a keypad. The ultrasonic input device 1658 may sense ultrasonic waves generated by an input tool through a microphone 1688 so as to identify data corresponding to the ultrasonic waves sensed.

The display 1660 (e.g., the display 1560) may include a panel 1662, a hologram device 1664, or a projector 1666. The panel 1662 may have a configuration that is the same as or similar to that of the display 1560 of FIG. 15. The panel 1662 may be, for example, flexible, transparent, or wearable. The panel 1662 and the touch panel 1652 may be integrated into a single module. The hologram device 1664 may display a stereoscopic image in a space using a light interference phenomenon. The projector 1666 may project light onto a screen so as to display an image. The screen may be disposed in the inside or the outside of the electronic device 1601. According to an embodiment of the present disclosure, the display 1660 may further include a control circuit for controlling the panel 1662, the hologram device 1664, or the projector 1666.

The interface 1670 may include, for example, an HDMI 1672, a USB 1674, an optical interface 1676, or a D-sub-miniature (D-sub) 1678. The interface 1670, for example, may be included in the communication interface 1570 illustrated in FIG. 15. Additionally or alternatively, the interface 1670 may include, for example, a mobile high-definition link (MHL) interface, an SD card/multi-media card (MMC) interface, or an infrared data association (IrDA) interface.

The audio module 1680 may convert, for example, a sound into an electrical signal or vice versa. At least a portion of elements of the audio module 1680 may be included in the input/output interface 1550 illustrated in FIG. 15. The audio module 1680 may process sound information input or output through a speaker 1682, a receiver 1684, an earphone 1686, or the microphone 1688.

The camera module 1691 is, for example, a device for shooting a still image or a video. According to an embodiment of the present disclosure, the camera module 1691 may include at least one image sensor (e.g., a front sensor or a rear sensor), a lens, an image signal processor (ISP), or a flash (e.g., an LED or a xenon lamp).

The power management module 1695 may manage power of the electronic device 1601. According to an embodiment of the present disclosure, the power management module 1695 may include a power management integrated circuit (PMIC), a charger integrated circuit (IC), or a battery or gauge. The PMIC may employ a wired and/or wireless charging method. The wireless charging method may include, for example, a magnetic resonance method, a magnetic induction method, an electromagnetic method, or the like. An additional circuit for wireless charging, such as a coil loop, a resonant circuit, a rectifier, or the like, may be further included. The battery gauge may measure, for example, a remaining capacity of the battery 1696 and a voltage, current or temperature thereof while the battery is charged. The battery 1696 may include, for example, a rechargeable battery and/or a solar battery.

The indicator 1697 may display a specific state of the electronic device 1601 or a part thereof (e.g., the processor 1610), such as a booting state, a message state, a charging state, or the like. The motor 1698 may convert an electrical signal into a mechanical vibration, and may generate a vibration or haptic effect. Although not illustrated, a processing device (e.g., a GPU) for supporting a mobile TV may be included in the electronic device 1601. The processing device for supporting a mobile TV may process media data according to the standards of digital multimedia broadcasting (DMB), digital video broadcasting (DVB), MEDIA-FLO™, or the like.

Each of the elements described herein may be configured with one or more components, and the names of the elements may be changed according to the type of an electronic device. In various embodiments of the present disclosure, an electronic device may include at least one of the elements described herein, and some elements may be omitted or other additional elements may be added. Furthermore, some of the elements of the electronic device may be combined with each other so as to form one entity, so that the functions of the elements may be performed in the same manner as before the combination.

Figure 17:
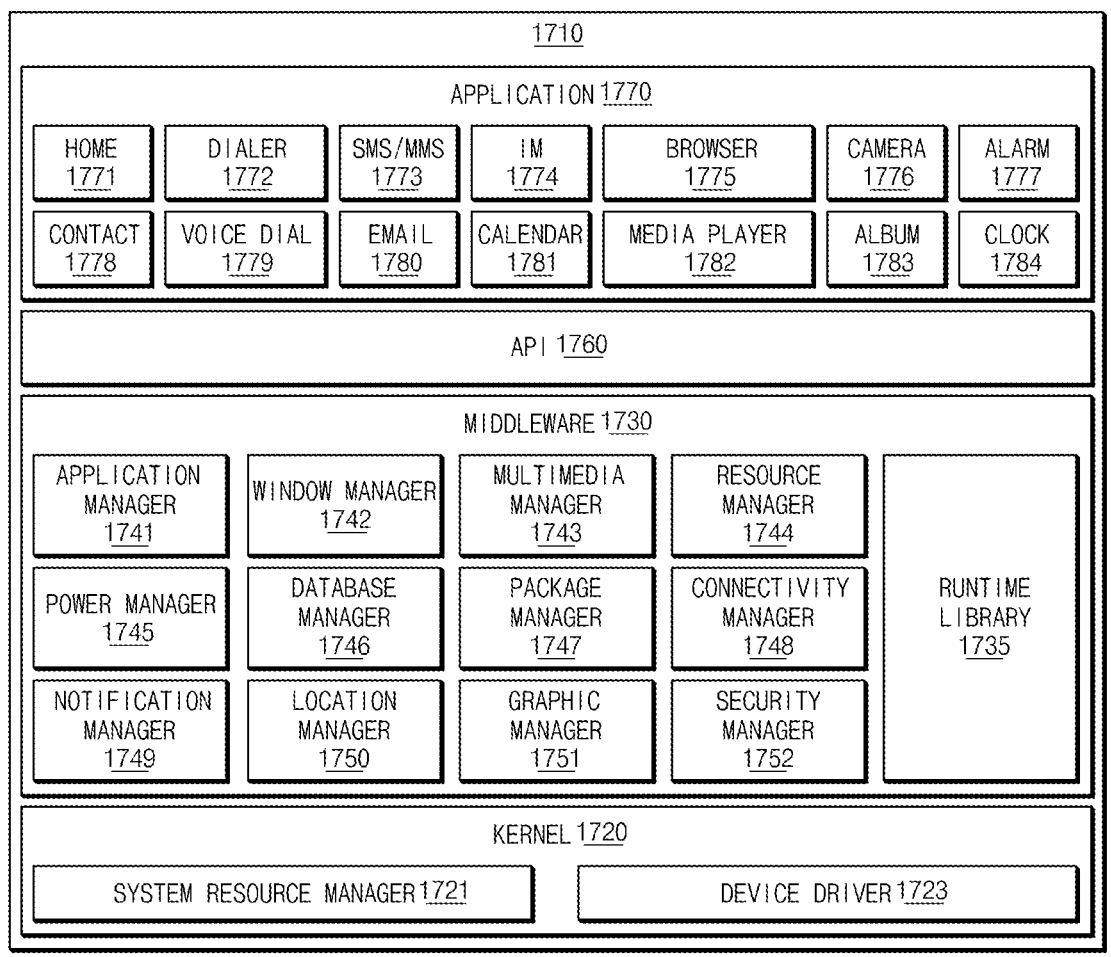
FIG. 17 illustrates a program module according to an embodiment of the present disclosure.

FIG. 17 illustrates a program module according to an embodiment of the present disclosure.

Referring to FIG. 17, a program module 1710 (e.g., the program 1540) may include an operating system (OS) for controlling a resource related to an electronic device (e.g., the electronic device 1501) and/or various applications (e.g., the application program 1547) running on the OS. The operating system may be, for example, ANDROID®, iOS®, WINDOWS®, SYMBIAN®, TIZEN®, or the like.

The program module 1710 may include a kernel 1720, a middleware 1730, an API 1760, and/or an application 1770. At least a part of the program module 1710 may be preloaded on an electronic device or may be downloaded from an external electronic device (e.g., the first electronic device 1502, the second external electronic device 1504, or the server 1506).

The kernel 1720 (e.g., the kernel 1541) may include, for example, a system resource manager 1721 or a device driver 1723. The system resource manager 1721 may perform control, allocation, or retrieval of a system resource. According to an embodiment of the present disclosure, the system resource manager 1721 may include a process management unit, a memory management unit, a file system management unit, or the like. The device driver 1723 may include, for example, a display driver, a camera driver, a Bluetooth driver, a shared memory driver, a USB driver, a keypad driver, a Wi-Fi driver, an audio driver, or an inter-process communication (IPC) driver.

The middleware 1730, for example, may provide a function that the applications 1770 require in common, or may provide various functions to the applications 1770 through the API 1760 so that the applications 1770 may efficiently use limited system resources in the electronic device. According to an embodiment of the present disclosure, the middleware 1730 (e.g., the middleware 1543) may include at least one of a runtime library 1735, an application manager 1741, a window manager 1742, a multimedia manager 1743, a resource manager 1744, a power manager 1745, a database manager 1746, a package manager 1747, a connectivity manager 1748, a notification manager 1749, a location manager 1750, a graphic manager 1751, and a security manager 1752.

The runtime library 1735 may include, for example, a library module that a complier uses to add a new function through a programming language while the application 1770 is running. The runtime library 1735 may perform a function for input/output management, memory management, or an arithmetic function.

The application manager 1741 may mange, for example, a life cycle of at least one of the applications 1770. The window manager 1742 may manage a GUI resource used in a screen. The multimedia manager 1743 may recognize a format required for playing various media files and may encode or decode a media file using a codec matched to the format. The resource manager 1744 may manage a resource such as a source code, a memory, or a storage space of at least one of the applications 1770.

The power manager 1745, for example, may operate together with a basic input/output system (BIOS) to manage a battery or power and may provide power information required for operating the electronic device. The database manager 1746 may generate, search, or modify a database to be used in at least one of the applications 1770. The package manager 1747 may manage installation or update of an application distributed in a package file format.

The connectivity manager 1748 may manage wireless connection of Wi-Fi, Bluetooth, or the like. The notification manager 1749 may display or notify an event such as message arrival, appointments, and proximity alerts in such a manner as not to disturb a user. The location manager 1750 may manage location information of the electronic device. The graphic manager 1751 may manage a graphic effect to be provided to a user or a user interface related thereto. The security manager 1752 may provide various security functions required for system security or user authentication. According to an embodiment of the present disclosure, in the case in which an electronic device (e.g., the electronic device 1501) includes a phone function, the middleware 1730 may further include a telephony manager for managing a voice or video call function of the electronic device.

The middleware 1730 may include a middleware module for forming a combination of various functions of the above-mentioned elements. The middleware 1730 may provide a module specialized for each type of an operating system to provide differentiated functions. Furthermore, the middleware 1730 may delete a part of existing elements or may add new elements dynamically.

The API 1760 (e.g., the API 1545) which is, for example, a set of API programming functions may be provided in different configurations according to an operating system. For example, in the case of ANDROID® or iOS®, one API set may be provided for each platform, and, in the case of TIZEN®, at least two API sets may be provided for each platform.

The application 1770 (e.g., the application program 1547), for example, may include at least one application capable of performing functions such as a home 1771, a dialer 1772, an SMS/MMS 1773, an instant message (IM) 1774, a browser 1775, a camera 1776, an alarm 1777, a contact 1778, a voice dial 1779, an e-mail 1780, a calendar 1781, a media player 1782, an album 1783, a clock 1784, health care (e.g., measure an exercise amount or blood sugar), or environmental information provision (e.g., provide air pressure, humidity, or temperature information).

According to an embodiment of the present disclosure, the application 1770 may include an information exchange application for supporting information exchange between the electronic device (e.g., the electronic device 1501) and an external electronic device (e.g., the first electronic device 1502 or the second external electronic device 1504). The information exchange application may include, for example, a notification relay application for relaying specific information to the external electronic device or a device management application for managing the external electronic device.

For example, the notification relay application may have a function for relaying, to an external electronic device (e.g., the first electronic device 1502 or the second external electronic device 1504), notification information generated in another application (e.g., an SMS/MMS application, an e-mail application, a health care application, an environmental information application, or the like) of the electronic device. Furthermore, the notification relay application may receive notification information from the external electronic device and may provide the received notification information to the user.

The device management application, for example, may manage (e.g., install, delete, or update) at least one function (e.g., turn-on/turn off of the external electronic device itself (or some elements) or the brightness (or resolution) adjustment of a display) of the external electronic device (e.g., the first electronic device 1502 or the second external electronic device 1504) communicating with the electronic device, an application running in the external electronic device, or a service (e.g., a call service, a message service, or the like) provided from the external electronic device.

According to an embodiment of the present disclosure, the application 1770 may include a specified application (e.g., a healthcare application of a mobile medical device) according to an attribute of the external electronic device (e.g., the first electronic device 1502 or the second external electronic device 1504). The application 1770 may include an application received from an external electronic device (e.g., the first electronic device 1502 or the second external electronic device 1504). The application 1770 may include a preloaded application or a third-party application downloadable from a server. The names of the elements of the program module 1710 illustrated may vary with the type of an operating system.

According to various embodiments of the present disclosure, at least a part of the program module 1710 may be implemented with software, firmware, hardware, or a combination thereof. At least a part of the program module 1710, for example, may be implemented (e.g., executed) by a processor (e.g., the processor 1610). At least a part of the program module 1710 may include, for example, a module, a program, a routine, sets of instructions, or a process for performing at least one function.

According to embodiments disclosed in the present disclosure, information with a relatively large amount of data may be shared with the user of the external electronic device regardless of the screen size of the display, the storage space of the memory, or the connection limit of the communication network.

In addition, according to embodiments disclosed in the present disclosure, since the account information is obtained from the external electronic device managing the account associated with the server, the information on available server may be provided.

In addition, according to embodiments disclosed in the present disclosure, since the contents, which are to be transmitted to the server, are generated using the template contents, the contents in more various forms may be shared with the user of the external electronic device.

Besides, various effects directly or indirectly identified in the present disclosure may be provided.

The term "module" used herein may represent, for example, a unit including one of hardware, software and firmware or a combination thereof. The term "module" may be interchangeably used with the terms "unit", "logic", "logical block", "component" and "circuit". The "module" may be a minimum unit of an integrated component or may be a part thereof. The "module" may be a minimum unit for performing one or more functions or a part thereof. The "module" may be implemented mechanically or electronically. For example, the "module" may include at least one of an application-specific integrated circuit (ASIC) chip, a field-programmable gate array (FPGA), and a programmable-logic device for performing some operations, which are known or will be developed.

At least a part of devices (e.g., modules or functions thereof) or methods (e.g., operations) according to various embodiments of the present disclosure may be implemented as instructions stored in a computer-readable storage medium in the form of a program module. In the case where the instructions are performed by a processor (e.g., the processor 1520), the processor may perform functions corresponding to the instructions. The computer-readable storage medium may be, for example, the memory 1530.

A computer-readable recording medium may include a hard disk, a floppy disk, a magnetic medium (e.g., a magnetic tape), an optical medium (e.g., CD-ROM, digital versatile disc (DVD)), a magneto-optical medium (e.g., a floptical disk), or a hardware device (e.g., a ROM, a RAM, a flash memory, or the like). The program instructions may include machine language codes generated by compilers and high-level language codes that can be executed by computers using interpreters. The above-mentioned hardware device may be configured to be operated as one or more software modules for performing operations of various embodiments of the present disclosure and vice versa.

A module or a program module according to various embodiments of the present disclosure may include at least one of the above-mentioned elements, or some elements may be omitted or other additional elements may be added. Operations performed by the module, the program module or other elements according to various embodiments of the present disclosure may be performed in a sequential, parallel, iterative or heuristic way. Furthermore, some operations may be performed in another order or may be omitted, or other operations may be added.

While the present disclosure has been shown and described with reference to certain embodiments thereof, it will be understood by those skilled in the art that various changes in form and details may be made therein without departing from the scope of the present disclosure. Therefore, the scope of the present disclosure should not be defined as being limited to the embodiments, but should be defined by the appended claims and equivalents thereof.

What is claimed is:

1. An electronic device comprising:
a sensor module configured to collect data corresponding to a type of exercise;
a display configured to display at least a portion of the data;
a communication module configured to communicate with an external electronic device;
a memory configured to store the data; and
a processor operatively connected to the sensor module, the display, the communication module, and the memory, the processor is configured to:
obtain account information on at least one account joined to a sharing service from the external electronic device;
analyze the account information to verify the at least one account;
generate an object to share at least a portion of the data with the sharing service;
output the object through the display;
identify whether account information is valid; and
wherein if the account information is not valid, restrict generation of the object, or
wherein if the account information is valid, generate the object, wherein the processor is configured to identify whether the account information is valid based on an access validity period included in a token associated with the account information.

2. The electronic device of claim 1, wherein the processor is configured to transmit the at least the portion of the data to the external electronic device when the object is selected.

3. The electronic device of claim 1, wherein the processor is configured to output only an object associated with an account selected by a user's setting to the display.

4. The electronic device of claim 1, wherein the processor is configured to, when the at least one account includes a plurality of accounts, generate a plurality of objects that respectively corresponds to the accounts.

5. The electronic device of claim 4, wherein the processor is configured to output at least one of a scroll bar for scrolling the objects or a check box for selecting at least one of the accounts to the display.

6. The electronic device of claim 4, wherein the processor is configured to group at least one of the objects based on a usage history with respect to the accounts.

7. The electronic device of claim 6, wherein the processor is configured to transmit at least the portion of the data to the external electronic device when a portion of the grouped objects is selected such that the at least the portion of the data is shared with the sharing service to which the accounts respectively corresponding to the grouped objects are joined.

8. An electronic device comprising:
a communication module configured to communicate with an external electronic device;
a memory configured to store one or more templates corresponding to a type of exercise, the one or more templates including at least one of: a map, an audio, an image, a video, or a virtual reality (VR) contents; and
a processor configured to:
obtain, via the communication module, exercise information from the external electronic device,
identify the type of exercise,
select, as a function of the identified type of exercise, a template from the one or more templates,
generate a content associated with exercise based on the exercise information obtained from the external electronic device and the one or more templates stored in the memory,
transmit, via the communication module, the content to a server providing a sharing service,
identify whether account information is valid; and
wherein if the account information is not valid, restrict generation of the content; or
wherein if the account information is valid, generate the content, wherein the processor is configured to identify whether the account information is valid based on an access validity period included in a token associated with the account information.

9. The electronic device of claim 8, wherein the processor is further configured to:

obtain, from the external electronic device, at least one of processed data of the exercise information to be shared, or account information on an account joined to the sharing service; and transmit, via the communication module, the at least one of the processed data or the account information to the sharing service.

10. The electronic device of claim 8, wherein the processor is configured to select at least a portion of the exercise information, which is used when generating the content, based on priorities designated according to the type of the exercise.

11. The electronic device of claim 8, wherein the processor is configured to generate the content in a background state.

12. An information processing system comprising:
a first electronic device configured to collect data corresponding to a type of exercise;
a second electronic device configured to obtain at least a portion of the data from the first electronic device and process the at least the portion of the data; and
a server configured to support a sharing service that obtains the processed portion of the data from the second electronic device and posts the processed portion of the data,
wherein the second electronic device is configured to transmit account information on at least one account joined to the sharing service to the first electronic device, and
wherein the first electronic device is configured to:
analyze the account information to verify the at least one account;
generate an object supporting posting the processed portion of the data on the sharing service;
output the object to a display of the first electronic device,
identify whether account information is valid; and
wherein if the account information is not valid, restrict generation of the object, or
wherein if the account information is valid, generate the object, wherein the processor is configured to identify whether the account information is valid based on an access validity period included in a token associated with the account information.

13. The information processing system of claim 12, wherein the data comprises at least one of exercise information, the processed portion of the data of the exercise information to be shared, or the account information on the account joined to the sharing service.

14. The information processing system of claim 12, wherein the first electronic device is configured to transmit the at least the portion of the data to the second electronic device when the object is selected.

15. The information processing system of claim 12, wherein the first electronic device is a wearable electronic device and the second electronic device is a mobile electronic device paired with the first electronic device.

16. The information processing system of claim 12, wherein, in a case that the first electronic device periodically synchronizes the data with the second electronic device, the first electronic device is configured to generate an event associated with the at least the portion of the data and transmit the event to the second electronic device instead of transmitting the at least the portion of the data when the object is selected after completing the synchronization without new data being collected.

17. The information processing system of claim 16, wherein the event comprises at least one of the account information, an object selection time, or identification information on the at least the portion of the data.

* * * * *